(12) United States Patent
Kim et al.

(10) Patent No.: US 12,499,508 B2
(45) Date of Patent: Dec. 16, 2025

(54) DEMOSAICING METHOD AND DEMOSAICING DEVICE

(71) Applicant: Samsung Electronics Co., Ltd., Suwon-si (KR)

(72) Inventors: Pilsu Kim, Suwon-si (KR); Seungwon Choi, Suwon-si (KR); Jongseong Choi, Suwon-si (KR); Byeongdae Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 333 days.

(21) Appl. No.: 18/222,196

(22) Filed: Jul. 14, 2023

(65) Prior Publication Data

US 2024/0202867 A1    Jun. 20, 2024

(30) Foreign Application Priority Data

Dec. 14, 2022    (KR) .......................... 10-2022-0174524

(51) Int. Cl.
*G06T 3/4015*   (2024.01)
*G06T 5/20*   (2006.01)
(Continued)

(52) U.S. Cl.
CPC .............. *G06T 3/4015* (2013.01); *G06T 5/20* (2013.01); *G06T 7/13* (2017.01); *G06T 7/90* (2017.01);
(Continued)

(58) Field of Classification Search
CPC .......... G06T 3/4015; G06T 5/20; G06T 7/13; G06T 7/90; G06T 2207/10024;
(Continued)

(56) References Cited

U.S. PATENT DOCUMENTS 5,373,322 A    12/1994    Laroche et al.
7,825,965 B2    11/2010    Achong et al.
(Continued)

FOREIGN PATENT DOCUMENTS

JP    6426909 B2    11/2018
KR    10-0932217 B1    12/2009
(Continued)

OTHER PUBLICATIONS

Battiato, Sebastiano & Guarnera, Mirko & Messina, Giuseppe & Tomaselli, Valeria, "Recent Patents on Color Demosaicing", Recent Patents on Computer Science, vol. 1, No. 3, Jun. 30, 2008, pp. 194-207, doi: 10.2174/1874479610801030194.

(Continued)

*Primary Examiner* — Ali Bayat
(74) *Attorney, Agent, or Firm* — Sughrue Mion, PLLC

(57) ABSTRACT

A demosaicing method for an input mosaic image includes: obtaining an input image, for each sub target pixel, estimating a main edge direction based on main color pixel values; determining the main edge direction by performing edge enhancement based on the input mosaic image; generating a main color demosaiced image by performing a main interpolation based on the main edge direction to generate interpolated main color pixel values corresponding to the sub target pixels; and generating a first sub color demosaiced image and a second sub color demosaiced image by performing a sub interpolation to generate interpolated first sub color pixel values and interpolated second sub color pixel values for the sub target pixels and for main target pixels corresponding to the main color pixel values.

20 Claims, 27 Drawing Sheets

(51) Int. Cl.
*G06T 7/13* (2017.01)
*G06T 7/90* (2017.01)
*G06V 10/56* (2022.01)

(52) U.S. Cl.
CPC .... *G06V 10/56* (2022.01); *G06T 2207/10024* (2013.01); *G06T 2207/20192* (2013.01)

(58) Field of Classification Search
CPC ........ G06T 2207/20192; G06T 3/4007; G06V 10/56; H04N 25/11
USPC ........................................................ 382/167
See application file for complete search history.

(56) References Cited

U.S. PATENT DOCUMENTS

| | | |
|---|---|---|
| 7,961,232 B2 | 6/2011 | Muresan |
| 8,768,069 B2 | 7/2014 | Springer et al. |
| 9,111,365 B2 | 8/2015 | Park et al. |
| 9,160,989 B2 | 10/2015 | Ogino |
| 9,723,283 B2 | 8/2017 | Niijima et al. |
| 2012/0081385 A1 | 4/2012 | Coté et al. |
| 2012/0081580 A1* | 4/2012 | Cote ...................... H04N 25/00 348/E5.024 |
| 2013/0278801 A1* | 10/2013 | Sawada ................ H04N 25/611 348/242 |
| 2015/0296193 A1* | 10/2015 | Cote ...................... G06T 3/4015 382/167 |
| 2017/0094210 A1* | 3/2017 | Galor Gluskin ..... H04N 23/672 |
| 2019/0355105 A1* | 11/2019 | Rasmusson ............... G06T 5/80 |
| 2024/0412344 A1* | 12/2024 | Viering .................. H05B 45/44 |

FOREIGN PATENT DOCUMENTS

| | | |
|---|---|---|
| KR | 10-1335127 B1 | 12/2013 |
| KR | 10-1794726 B1 | 11/2017 |

OTHER PUBLICATIONS

B. G. Jeong, H. S. Kim, S. C. Kim and I. K. Eom, "Edge-Adaptive Demosaicking for Reducing Artifact along Line Edge," 2008 Congress on Image and Signal Processing, May 27, 2008, pp. 316-319, doi: 10.1109/CISP.2008.660.

Thakur, Rajesh & Tripathy, Animesh & Ray, Ajoy, "A Design Framework of Digital Camera Images Using Edge Adaptive and Directionally Weighted Color Interpolation Algorithm", 2009 International Joint Conference on Computational Sciences and Optimization, Apr. 24, 2009, pp. 905-909, doi: 10.1109/CSO.2009.383.

European Extended Search Report issued Feb. 20, 2024 by the European Patent Office for EP Patent Application No. 23190958.1.

* cited by examiner

| R | G | R | G | R |
|---|---|---|---|---|
| G | B | G | B | G |
| R | G | R | G | R |
| G | B | G | B | G |
| R | G | R | G | R |

DEMOSAICING METHOD AND DEMOSAICING DEVICE

CROSS-REFERENCE TO RELATED APPLICATION

This application is based on and claims priority under 35 USC § 119 to Korean Patent Application No. 10-2022-0174524, filed on Dec. 14, 2022, in the Korean Intellectual Property Office (KIPO), the disclosure of which is incorporated by reference herein in its entirety.

BACKGROUND

1. Field

The disclosure relates to semiconductor integrated circuits, and more particularly to a demosaicing method and a demosaicing device.

2. Description of Related Art

Because each pixel in an image sensor may detect only one color, values for the remaining colors may be calculated by interpolation of pixel values from neighboring pixels. This color plane interpolation may be referred to as demosaicing.

A demosaicing method of reconstructing missing color pixel values may result in so-called zipper effect and block noise such as random color dots. Additionally, there may be a trade-off between filtering for noise and blurring sharp edges. Interpolating a missing pixel value with surrounding pixel values may blur the image when pixels at an edge are interpolated. In addition, the interpolation may also result in a decrease in the sharpness of the image at the edges, which may be due to the averaging of the pixels crossing the edges included in the picture.

Some demosaicing methods of color filter array (CFA) images or mosaic images may cause reduced image detail, false color, and artifacts such as jagging due to linear interpolation-based restoration. In addition, errors may accumulate because the color of a particular restoration step may be restored using color channels restored in a previous step.

SUMMARY

Provided is a demosaicing method, a demosaicing device and a system including the demosaicing device, capable of reducing color error and improving image sharpness.

Additional aspects will be set forth in part in the description which follows and, in part, will be apparent from the description, or may be learned by practice of the presented embodiments.

In accordance with an aspect of the disclosure, a demosaicing method for an input mosaic image includes obtaining an input image comprising main color pixel values corresponding to a main color, first sub color pixel values corresponding to a first sub color, and second sub color pixel values corresponding to a second sub color, wherein the main color pixel values, the first sub color pixel values, and the second sub color pixel values are arranged in a regular pattern; for each sub target pixel from among sub target pixels corresponding to the first sub color pixel values and the second sub color pixel values, estimating a main edge direction based on the main color pixel values; determining the main edge direction by performing edge enhancement based on the input mosaic image; generating a main color demosaiced image corresponding to the main color by performing a main interpolation based on the main edge direction to generate interpolated main color pixel values corresponding to the sub target pixels; and generating a first sub color demosaiced image corresponding to the first sub color and a second sub color demosaiced image corresponding to the second sub color by performing a sub interpolation to generate interpolated first sub color pixel values and interpolated second sub color pixel values for the sub target pixels and for main target pixels corresponding to the main color pixel values.

In accordance with an aspect of the disclosure, a demosaicing method of an input mosaic image includes obtaining an input image in which green pixel values corresponding to a green color, red pixel values corresponding to a red color, and blue pixel values corresponding to a blue color are arranged in a Bayer pattern; for each sub target pixel from among sub target pixels corresponding to the red pixel values and the blue pixel values of the input mosaic image, estimating a main edge direction based on the green pixel values; determining the main edge direction by performing edge enhancement based on the input mosaic image; generating a green demosaiced image corresponding to the green color by performing a main interpolation based on the main edge direction to generate interpolated green color pixel values for the sub target pixels; for each sub target pixel, determining a first sub edge direction based on the green pixel values; generating a red intermediate image and a blue intermediate image by performing a first sub interpolation based on the first sub edge direction to generate interpolated red pixel values for the sub target pixels corresponding to the blue pixel values, and to generate interpolated blue pixel values for the sub target pixels corresponding to the red pixel values; for each main target pixel from among main target pixels corresponding to the green pixel values, estimating a second sub edge direction based on the red intermediate image or the blue intermediate image; determining the second sub edge direction by performing the edge enhancement based on the input mosaic image; and generating red demosaiced image and a blue demosaiced image by performing a second sub interpolation based on the second sub edge direction to generate interpolated red pixel values for the main target pixels and interpolated blue pixel values for the main target pixels.

In accordance with an aspect of the disclosure, a demosaicing device for an input mosaic image in which main color pixel values corresponding to a main color, first sub color pixel values corresponding to a first sub color, and second sub color pixel values corresponding to a second sub color are arranged in a regular pattern, includes a main edge estimator configured to, for each sub target pixel from among sub target pixels corresponding to the first sub color pixel values and the second sub color pixel values, estimate a main edge direction based on the main color pixel values; a main edge enhancer configured to determine the main edge direction by performing edge enhancement based on the input mosaic image; a main interpolator configured to generate a main color demosaiced image corresponding to the main color by performing a main interpolation based on the main edge direction to generate interpolated main color pixel values for the sub target pixels; and a sub interpolator configured to generate a first sub color demosaiced image corresponding to the first sub color and a second sub color demosaiced image corresponding to the second sub color by performing a sub interpolation to generate interpolated first sub color pixel values and interpolated second sub color pixel values for the sub target pixels and for main target pixels corresponding to the main color pixel values.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION OF THE EMBODIMENTS

Figure 1:
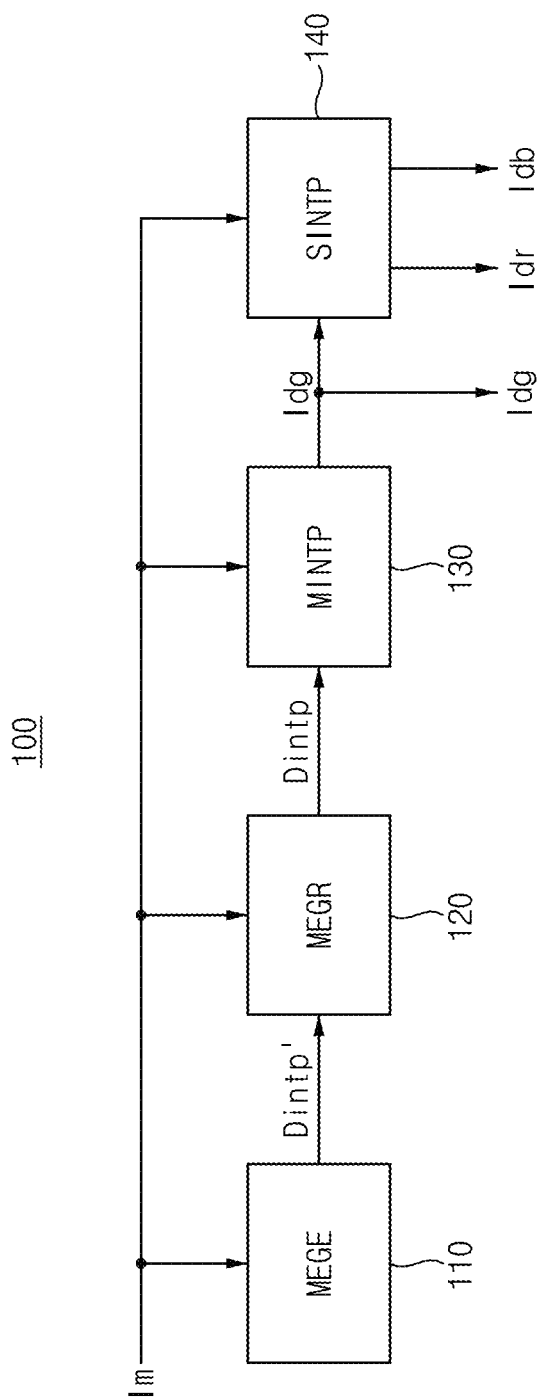
FIG. 1 is a block diagram illustrating a demosaicing device according to an embodiment.

Various example embodiments will be described more fully hereinafter with reference to the accompanying drawings, in which some example embodiments are shown. In the drawings, like numerals refer to like elements throughout. For convenience, redundant or duplicative description may be omitted.

As is traditional in the field, the example embodiments may be described and illustrated in terms of blocks which carry out a described function or functions. These blocks, which may be referred to herein as units, modules, circuits, blocks, controllers, nodes, and the like, or using names such as estimator, enhancer, filter, generator, interpolator, enhancer, interface, transceiver, processor, engine, and the like, are physically implemented by analog or digital circuits such as logic gates, integrated circuits, microprocessors, microcontrollers, memory circuits, passive electronic components, active electronic components, optical components, hardwired circuits, or the like, and in embodiments may be driven by firmware. The circuits may, for example, be embodied in one or more semiconductor chips, or on substrate supports such as printed circuit boards and the like. The circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of embodiments may be physically separated into two or more interacting and discrete blocks without departing from the scope of the disclosure. Likewise, the blocks of embodiments may be physically combined into more complex blocks without departing from the scope of the disclosure.

Figure 2:
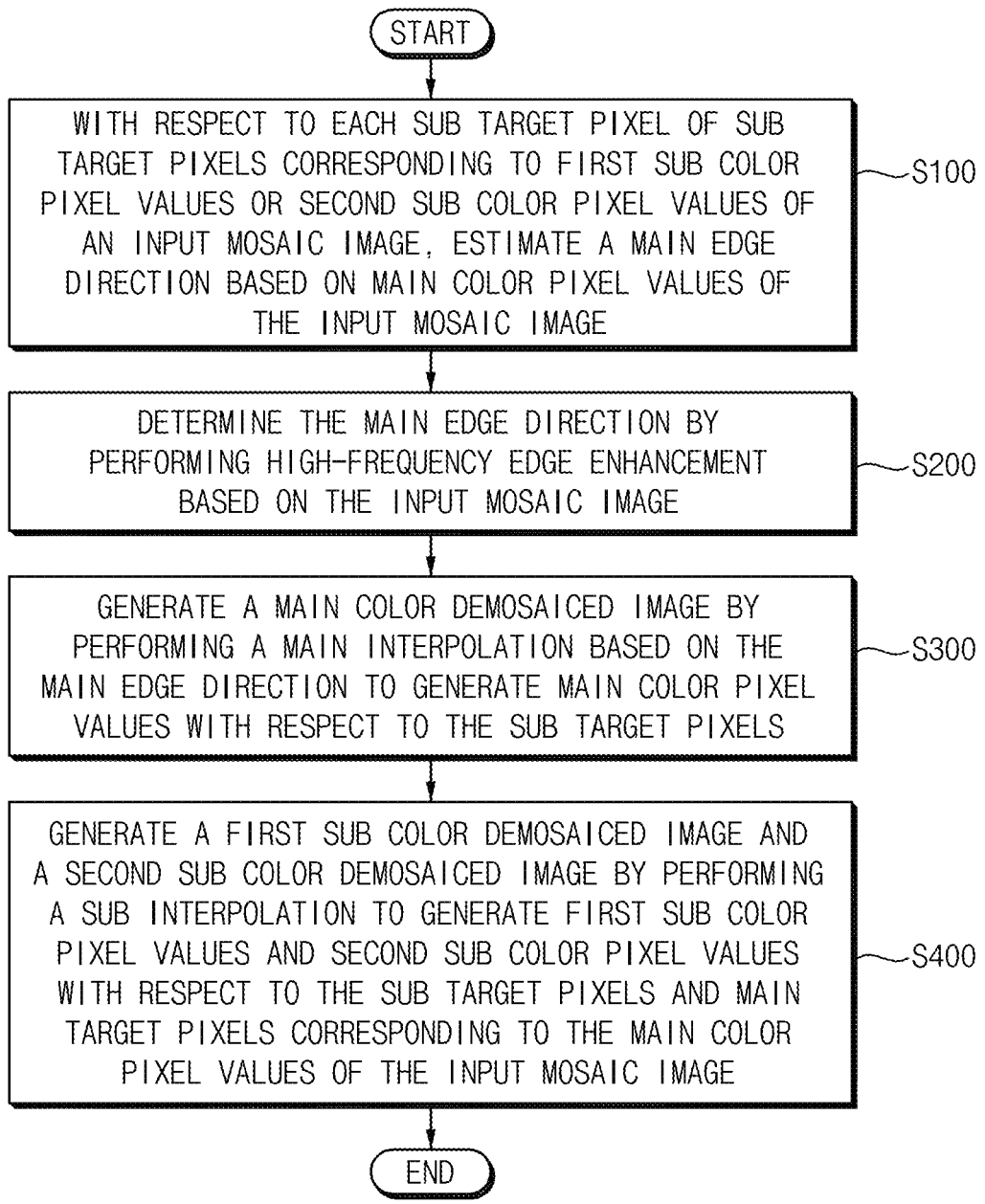
FIG. 2 is a flowchart illustrating a demosaicing method according to an embodiment.

FIG. 1 is a block diagram illustrating a demosaicing device according to example embodiments, and FIG. 2 is a flowchart illustrating a demosaicing method according to example embodiments.

Referring to FIG. 1, a demosaicing device 100 may include a main edge estimator 110 (illustrated as "MEGE"), a main edge enhancer 120 (illustrated as "MEGR"), a main interpolator 130 (illustrated as "MINTP"), and a sub interpolator 140 (illustrated as "SINTP"). The demosaicing device 100 may generate demosaiced images respectively corresponding to a main color, a first sub color and a second sub color by demosaicing an input mosaic image Im in which main color pixel values, first sub color pixel values, and second sub color pixel values, respectively corresponding to the main color, the first sub color, and the second sub color, are arranged in a regular pattern.

Referring to FIGS. 1 and 2, the main edge estimator 110 may, with respect to each sub target pixel of sub target pixels corresponding to first sub color pixel values or second sub color pixel values of the input mosaic image Im, estimate a main edge direction Dintp' based on main color pixel values of the input mosaic image Im at operation S100. The estimation of the main edge direction Dintp' based on the main color pixel values may be performed by methods using pixel gradient, methods using local similarity, and so on.

The main edge enhancer 120 may determine the main edge direction Dintp by performing high-frequency edge enhancement based on the input mosaic image Im at operation S200. Examples of the high-frequency edge enhancement based on the input mosaic image Im are described below with reference to FIGS. 6 through 13.

As such, color error near edges may be reduced and image sharpness may be improved by improving the performance of detecting the edge direction, that is, by estimating the main edge direction Dintp' based on the main color pixel values and then determining the main edge direction Dintp by reinforcing the estimated main edge direction Dintp'.

The main interpolator 130 may generate a main color demosaiced image Idg corresponding to a main color by performing a main interpolation based on the main edge direction Dintp to generate main color pixel values with respect to the sub target pixels at operation S300.

In some example embodiments, the main interpolator 130 may perform the main interpolation using direction color differences based on gradient. Examples of the gradient-based direction color differences are described below with reference to FIG. 14.

The sub interpolator 140 may generate a first sub color demosaiced image Idr corresponding to a first sub color and a second sub color demosaiced image Idb corresponding to a second sub color by performing a sub interpolation to generate first sub color pixel values and second sub color pixel values with respect to the sub target pixels and main target pixels corresponding to the main color pixel values of the input mosaic image Im at operation S400.

In some example embodiments, the sub interpolation may include a first sub interpolation to generate first sub color pixel values with respect to the sub target pixels corresponding to the second sub color pixel values and to generate second sub color pixel values with respect to the sub target pixels corresponding to the first sub color pixel values, and a second sub interpolation to generate first sub color pixel values with respect to the sub target pixels corresponding to the second sub color pixel values and generate second sub color pixel values with respect to the sub target pixels corresponding to the first sub color pixel values. Examples of the sub interpolation are described below with reference to FIGS. 15 through 19B.

Accordingly, the demosaicing method and the demosaicing device according to example embodiments may reduce color error near edges and improve image sharpness by improving the performance of detecting the edge direction through high-frequency edge enhancement. In addition, the demosaicing method and the demosaicing device according to example embodiments may further improve the image sharpness through the main interpolation which may extract the directional color difference based on the gradient, and the sub interpolation which may consider directionality.

Figure 3:
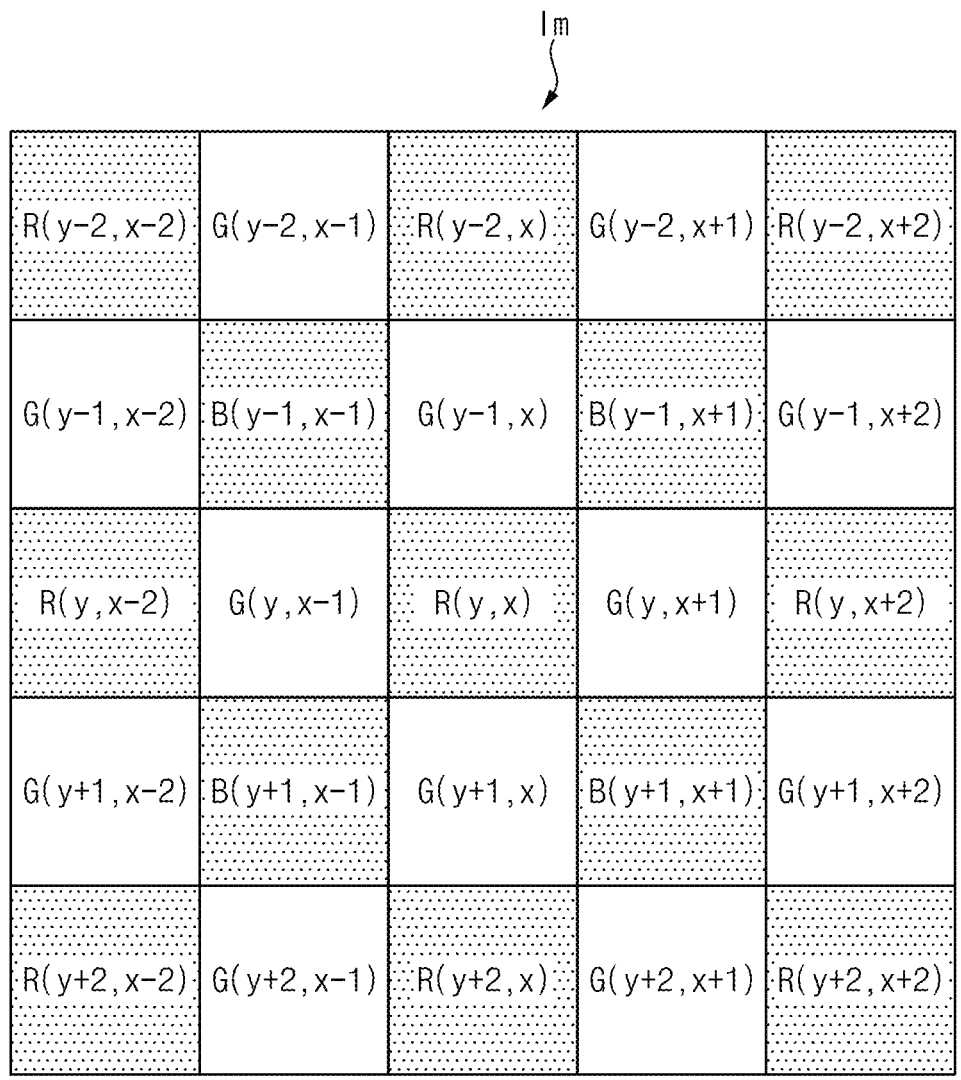
FIG. 3 is a diagram illustrating an example of an input mosaic image of a demosaicing method according to an embodiment.

FIG. 3 is a diagram illustrating an example of an input mosaic image of a demosaicing method according to example embodiments.

Demosaicing may refer to digital image processing which may be used to generate a full color image or a demosaiced image from an incomplete color data image (e.g., a mosaic image or a color filter array (CFA) image) obtained from an image sensor containing a CFA. According to embodiments, various patterns may be used for the CFA and the input mosaic image. Hereinafter, examples are described which relate to a Bayer pattern for convenience of illustration and description, but example embodiments are not limited to the Bayer pattern.

The demosaicing module or device may refer to a module that interpolates a CFA image such as a Bayer image received from an image sensor, into a channel image corresponding to each color, which may be an important function of an image signal processor (ISP).

In some related-art demosaicing methods, problems such as deterioration of detail and false color may occur. According to example embodiments, color errors that may occur due to interpolation errors in some related-art demosaicing algorithms may be removed or reduced.

In an example embodiment, the input mosaic image Im may have a Bayer pattern as illustrated in FIG. 3, in which y represents a column of pixels and x represents a row of pixels. Accordingly, (y,x) may represent the position or coordinates of a pixel. FIG. 3 shows the pixel values of the Bayer pattern. The pixel values of the input mosaic image Im may be expressed as I(y,x) for the (y,x) position, and I(y,x) may be expressed as R(y,x), G(y,x) or B(y,x) depending on the color of red (R), green (G) and blue (B) of the corresponding pixel.

In the case of the Bayer pattern, the sampling rate for green (G) may be ½, the sampling rate for red (R) and the sampling rate for blue (B) may be ¼. Here, the sampling rate may refer to the ratio of the number of pixels corresponding to a color to the total number of pixels.

The main color may refer to a color corresponding to the largest sampling rate, and the sub colors may refer to colors corresponding to a sampling rate smaller than the main color. Accordingly, the sampling rate for the main color may be greater than the sampling rate for the first sub color and the sampling rate for the second sub color. In the case of the Bayer pattern of FIG. 3, the main color corresponds to green (G), the first sub color corresponds to red (R), and the second sub color corresponds to blue (B).

Hereinafter, "R" may represent a red color, a red pixel or a red pixel value, "G" may represent a green color, a green pixel or a green pixel value, and "B" may represent a blue color, a blue pixel or a blue pixel value.

In FIG. 3, squares hatched with dots represent the sub target pixels STP, and squares not hatched represent the main target pixels MTP. In the case of the Bayer pattern, the main target pixels MTP correspond to the green pixel values G of the input mosaic image Im and the sub target pixels STP correspond to the red pixel values R of the input mosaic image Im or blue pixel values B of the input mosaic image Im. For convenience of illustration and description, FIG. 3 shows the input mosaic image Im including 25 pixels arranged in a matrix form having 5 pixel columns and 5 pixel rows, but embodiments are not limited thereto, and in embodiments the number of pixels in the input mosaic image Im may be arranged in any manner.

Figure 4A:
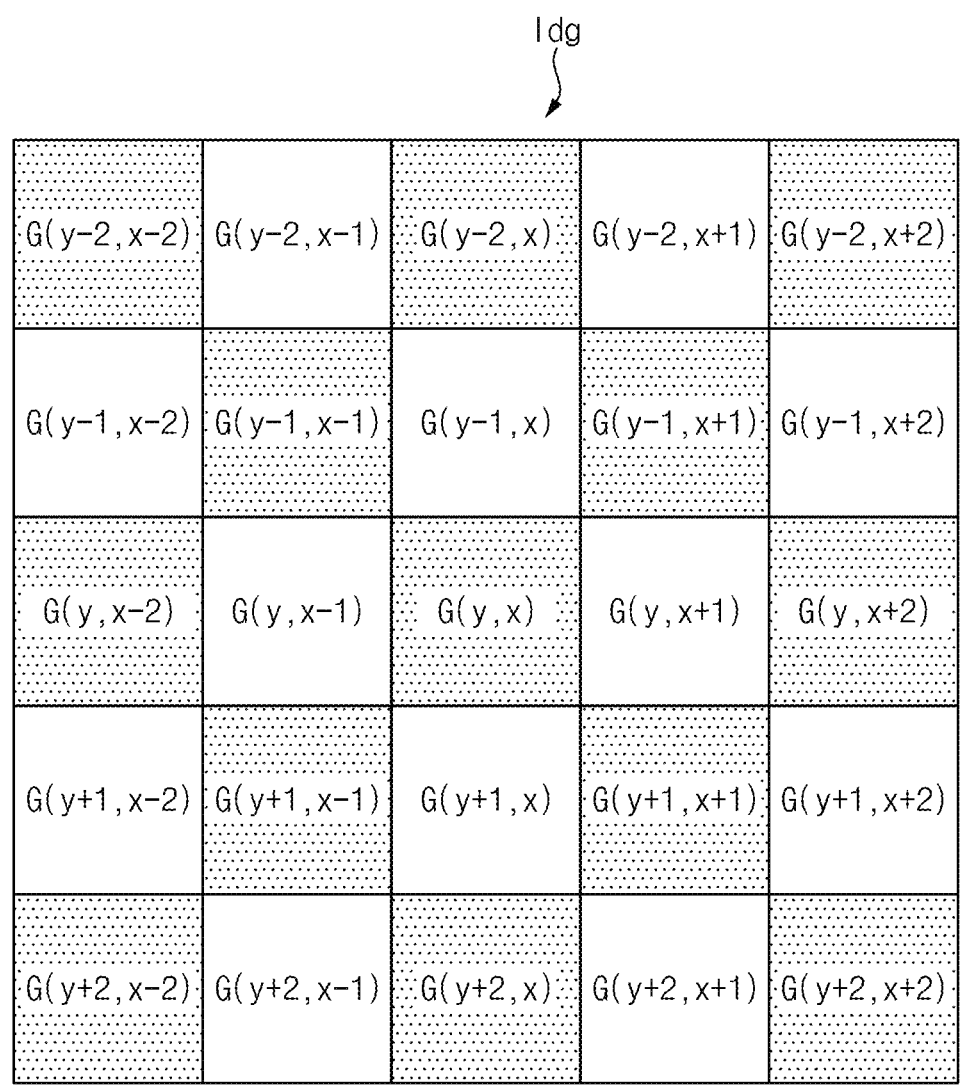
FIGS. 4A, 4B and 4C are diagrams illustrating demosaiced images corresponding to the input mosaic image of FIG. 3, according to an embodiment.
Figure 4B:
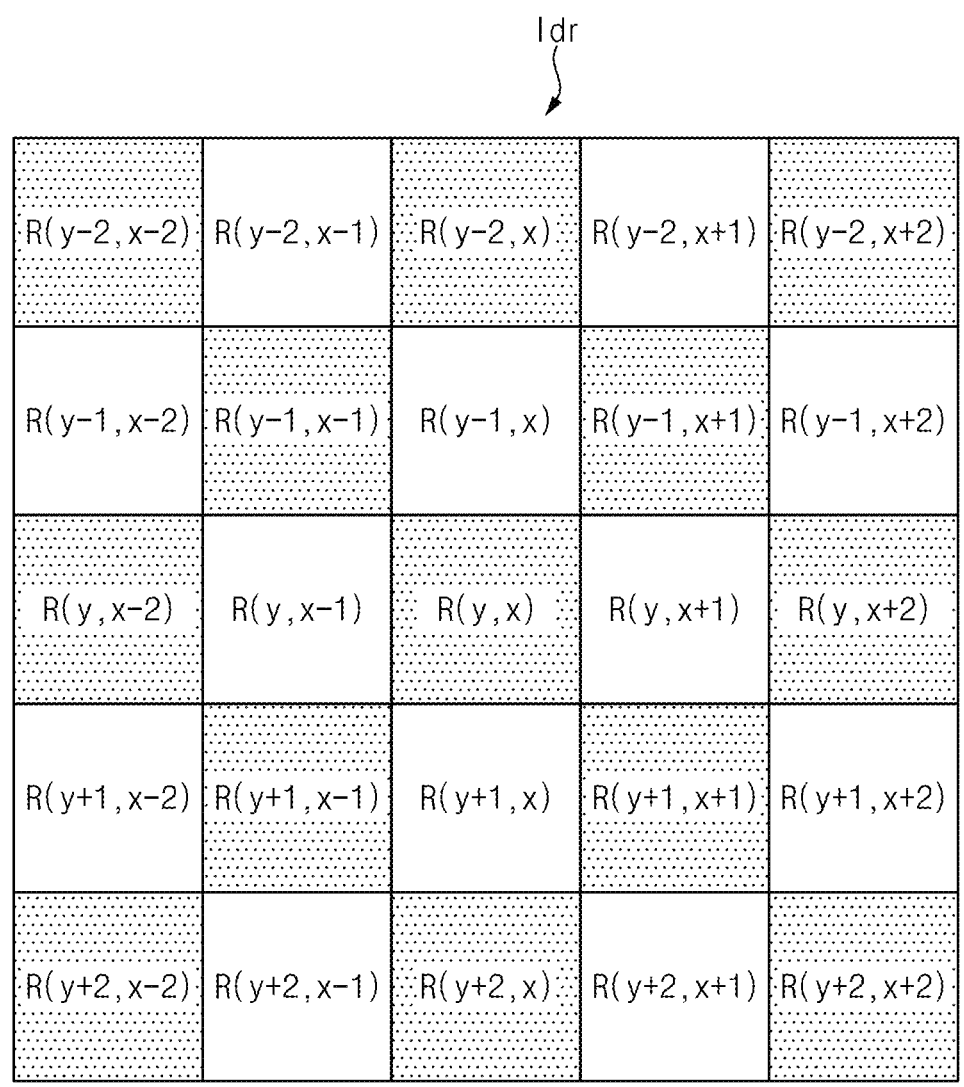
Figure 4C:
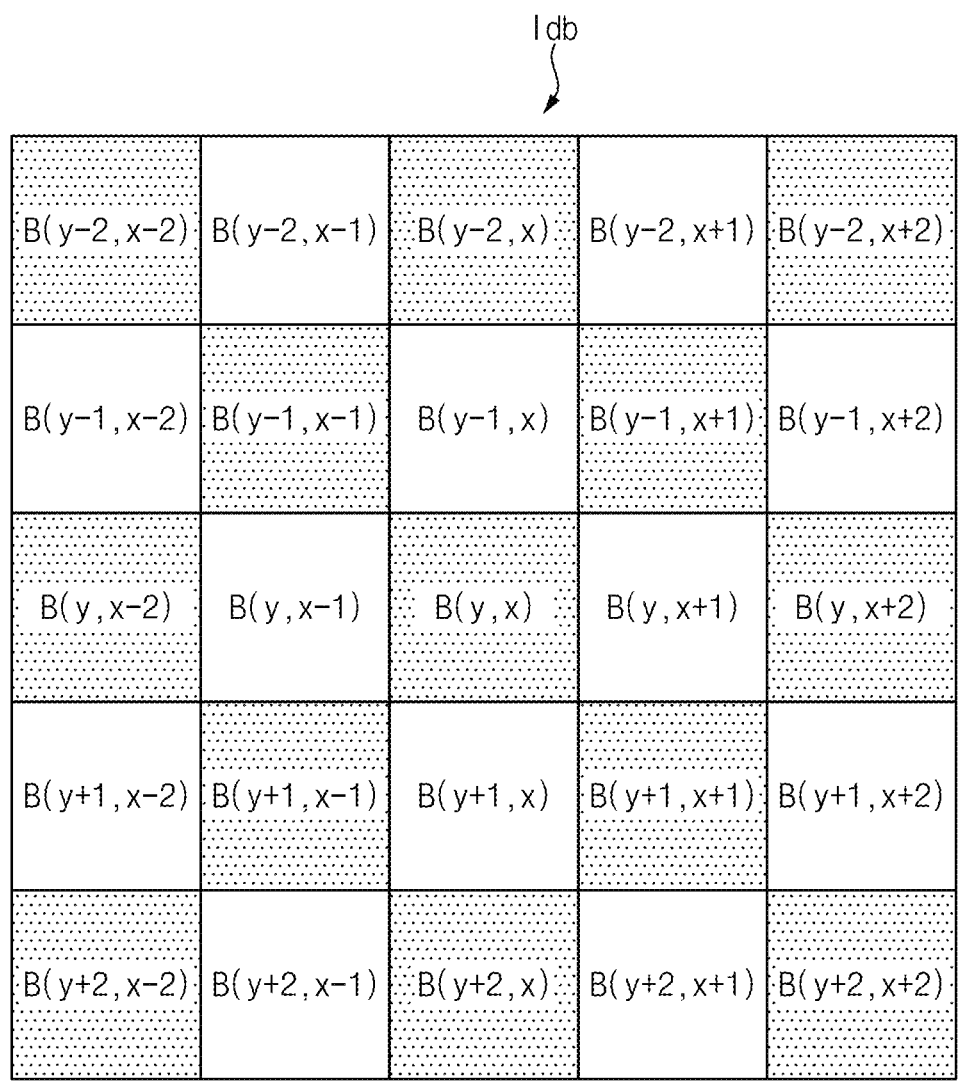

FIGS. 4A, 4B and 4C are diagrams illustrating demosaiced images corresponding to the input mosaic image of FIG. 3.

FIG. 4A illustrates a green demosaiced image Idg corresponding to the main color demosaiced image, FIG. 4B illustrates a red demosaiced image Idr corresponding to the first sub color demosaiced image, and FIG. 4C illustrates a blue demosaiced image Idb corresponding to the second sub color demosaiced image.

The main interpolation according to example embodiments may be performed to generate the green demosaiced image Idg, and then the sub interpolation according to example embodiments may be performed to generate the red demosaiced image Idr and the blue demosaiced image Idb.

First, the main interpolation may be performed on the green pixels G corresponding to the main color having a relatively large amount of spatial information due to the high sampling rate. After that, based on the information of the interpolated green pixels G, the sub interpolation may be performed on the red pixels R and the blue pixels B corresponding to the missing sub colors.

Figure 5:
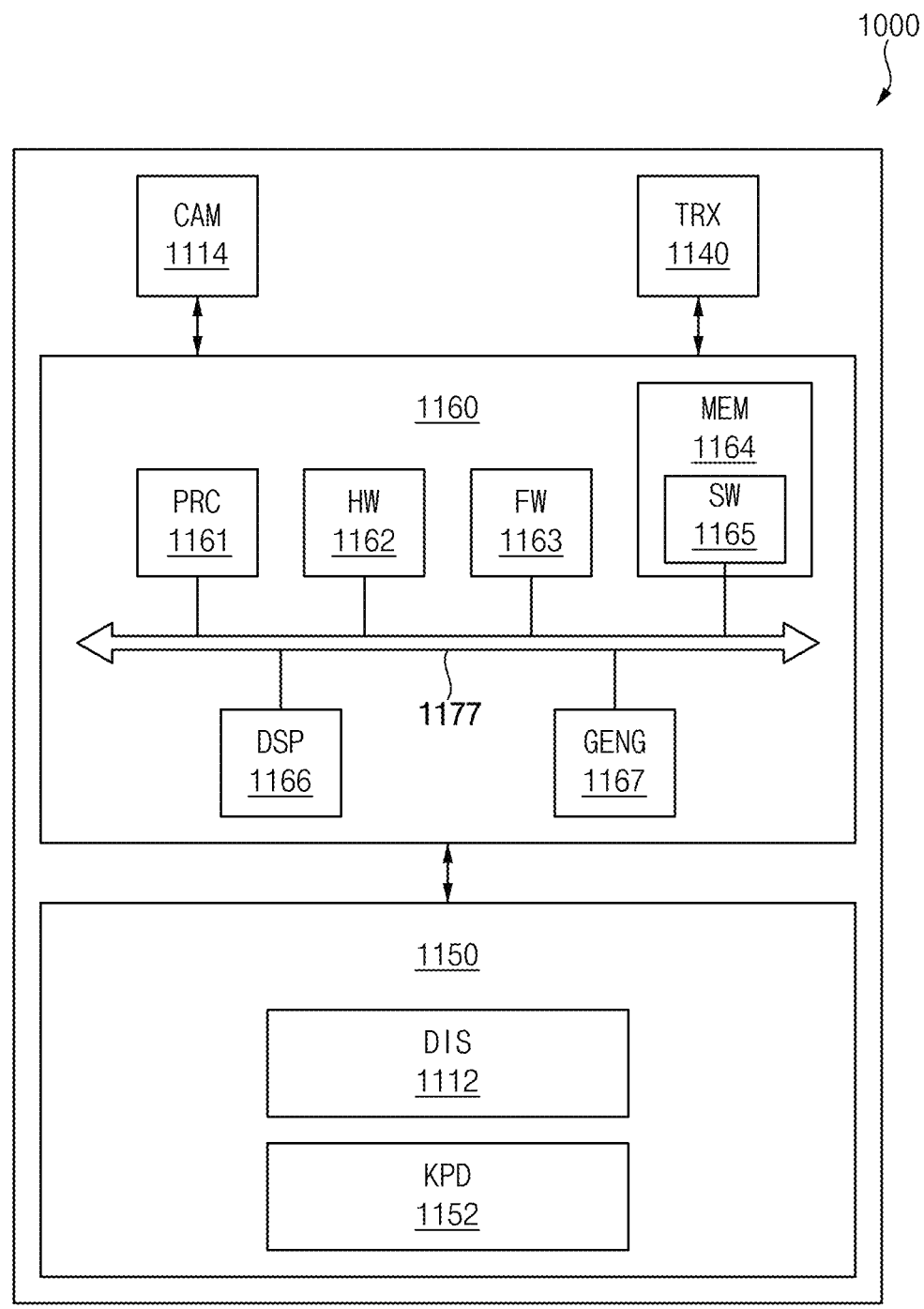
FIG. 5 is a block diagram illustrating a system performing a demosaicing method according to an embodiment.

FIG. 5 is a block diagram illustrating a system performing a demosaicing method according to example embodiments.

Referring to FIG. 5, a system 1000 may include camera module 1114 (illustrated as "CAM"), a transceiver 1140 (illustrated as "TRX"), a control unit 1160 and a user interface 1150.

The camera module 1114 may include a camera and/or an image sensor to capture and provide images. In some example embodiments, the camera module 1114 may include a plurality of cameras to capture a plurality of input images to be merged. In some example embodiments, the camera module 1114 may provide a plurality of input images to be merged where the plurality of input images are captured by a single camera.

The transceiver 1140 may provide connectivity through wired or wireless links to other networks such as an internet, a cellular network, etc.

The user interface 1150 may include input devices 1152 (illustrated as "KPD") such as a keyboard, a keypad, etc. and a display device 1112 (illustrated as "DSP") to display images. In some examples, a virtual keypad or keyboard may be integrated into the display device 1112 with a touch screen/sensor or the like.

The control unit 1160 may include a general purpose processor 1161 (illustrated as "PRC"), a hardware device 1162 (illustrated as "HW"), a firmware device 1163 (illustrated as "FW"), a memory 1164 (illustrated as "MEM"), a digital signal processor 1166 (illustrated as "DSP"), a graphics engine 1167 (illustrated as "GENG"), and a bus 1177. In embodiments, the control unit 1160 may perform demosaicing methods described herein according to example embodiments. For example, the control unit 1160 may be configured to perform functions of demosaicing devices described herein, for example the demosaicing device 100 described above.

Example embodiments may be implemented as hardware, software, a firmware, or a combination thereof.

In some example embodiments, demosaicing methods according to example embodiments may be performed by the digital signal processor 1166. For example, demosaicing devices such as the demosaicing device 100 described above may include or may be included in the digital signal processor 1166. Demosaicing methods according to example embodiments may be performed by a calculation circuit included in a graphics processing unit (GPU), a neural network processing unit (NPU), an ISP, a digital signal processor (DSP), a CPU, and the like, or may be performed by a dedicated device.

In some example embodiments, at least a portion of the methods according to example embodiments may be performed by program instructions that are executed by a processing device. The program instructions may be stored in the memory 1164 as software 1165 (illustrated as "SW"), and the program instructions may be executed by the general purpose processor 1161 and/or the digital signal processor 1166.

In some example embodiments, to execute the program instructions, the general purpose processor 1161 may retrieve or fetch the program instructions from an internal register, an internal cache, or the memory 1164 and decode and execute the instructions. During or after execution of the program instructions, the general purpose processor 1161 may write one or more results (which may be intermediate or final results) of the program instructions to the internal register, internal cache, or the memory 1164.

The system 1000 may be a computer system taking any suitable physical form. For example, the system 1000 may be an embedded computer system, a system-on-chip (SOC), a single-board computer system (SBC) such as a computer-on-module (COM) or system-on-module (SOM), a desktop computer system, a laptop or notebook computer system, an interactive kiosk, a mainframe, a mesh of computer systems, a mobile telephone, a personal digital assistant (PDA), a server, a tablet computer system, or a combination of two or more of these.

The program instruction for implementing methods according to example embodiments may be stored in a computer-readable non-transitory storage medium or media. The computer-readable non-transitory storage medium may include one or more semiconductor-based or other integrated circuits (ICs) such as field-programmable gate arrays (FPGAs) or application-specific ICs (ASICs), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, secure digital (SD) cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 6:
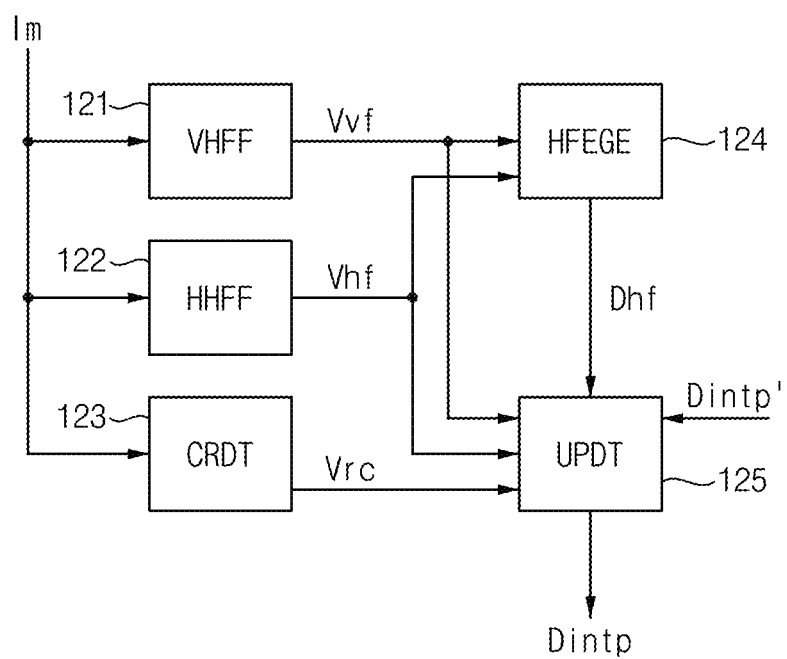
FIG. 6 is a block diagram illustrating an example embodiment of a main edge enhancer included in a demosaicing device according to an embodiment.
Figure 7:
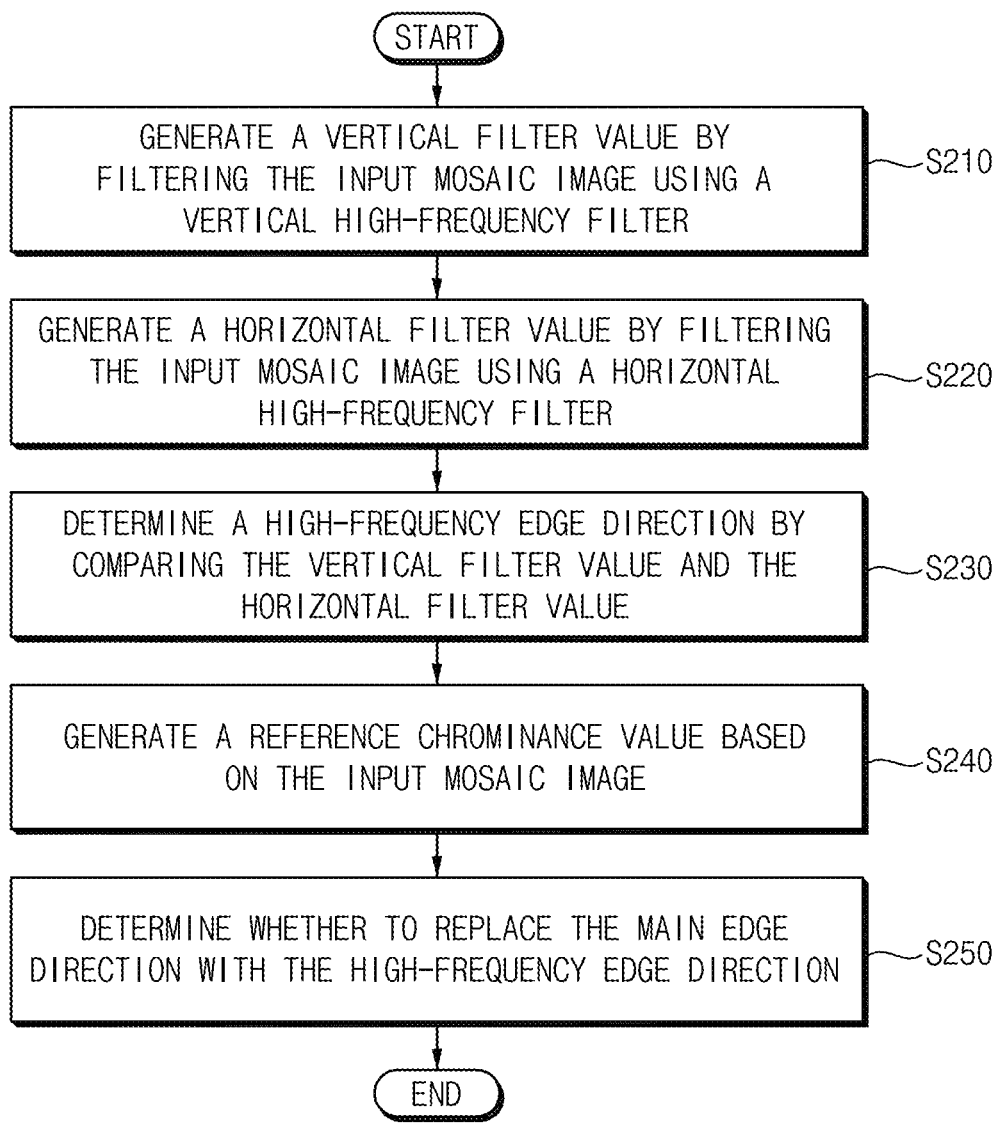
FIG. 7 is a flow chart illustrating an example embodiment of a high-frequency edge enhancement of a demosaicing method according to an embodiment.

FIG. 6 is a block diagram illustrating an example embodiment of a main edge enhancer included in a demosaicing device according to example embodiments, and FIG. 7 is a flow chart illustrating an example embodiment of a high-frequency edge enhancement of a demosaicing method according to example embodiments.

Referring to FIG. 6, a main edge enhancer 120 may include a vertical high-frequency filter 121 (illustrated as "VHFF"), a horizontal high-frequency filter 122 (illustrated as "HHFF"), a chrominance generator 123 (illustrated as "CRDT"), a high-frequency edge estimator 124 (illustrated as "HFEGE"), and an update determiner 125 (illustrated as "UPDT"). In embodiments, a high-frequency filter may refer to a high-pass filter which may filter out or remove frequencies below a particular value. In embodiments, the vertical high-frequency filter 121 may be a high-pass filter in a vertical direction, and the horizontal high-frequency filter 122 may be a high-pass filter in a horizontal direction which is perpendicular to the vertical direction.

With respect to each sub target pixel, the vertical high-frequency filter 121 may generate a vertical filter value Vvf by filtering the input mosaic image Im at operation S210.

With respect to each sub target pixel, the horizontal high-frequency filter 122 may generate a horizontal filter value Vhf by filtering the input mosaic image Im at operation S220.

With respect to each sub target pixel, the high-frequency edge estimator 124 may determine a high-frequency edge direction Dhf by comparing the vertical filter value Vvf and the horizontal filter value Vhf at operation S230. In embodiments, the high-frequency edge direction Dhf may be referred to as an enhancement direction.

With respect to each sub target pixel, the chrominance generator 123 may generate a reference chrominance value Vrc based on the input mosaic image Im at operation S240.

With respect to each sub target pixel, the update determiner 125 may determine whether to replace the main edge direction Dintp', which is estimated, with the high-frequency edge direction Dhf at operation S250.

Hereinafter, examples of the high-frequency edge enhancement of FIGS. 6 and 7 are further described with reference to FIGS. 8 through 13.

Figure 8:
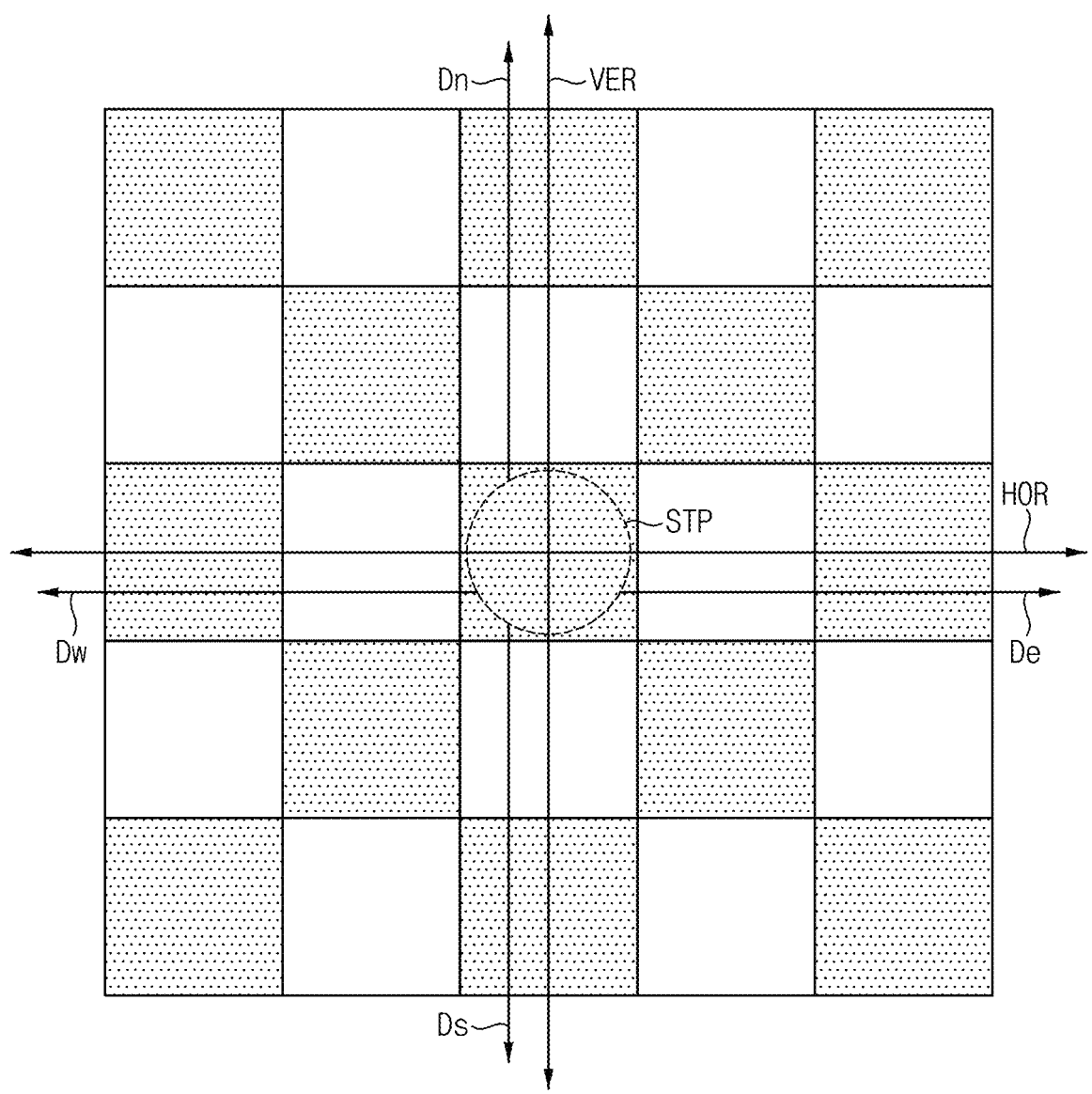
FIG. 8 is a diagram illustrating an edge direction for a main interpolation of a demosaicing method according to an embodiment.

FIG. 8 is a diagram illustrating an edge direction for a main interpolation of a demosaicing method according to example embodiments.

Referring to FIG. 8, the main edge direction for the main interpolation may include a horizontal direction HOR and a vertical direction VER. The horizontal direction HOR may be subdivided into a left direction Dw or a right direction De based on the sub target pixel STP. The vertical direction VER may be subdivided into an upper direction Dn or a lower direction Ds based on the sub target pixel STP.

The demosaicing module or device may be a module that interpolates a color filter array (CFA) image, such as a Bayer image received from an image sensor, into a channel image corresponding to each color, and may be an important function of an ISP.

In general, because directional interpolation may be performed along an edge direction, the edge direction may greatly affect demosaicing performance.

The main edge estimator 110 of FIG. 1 may estimate the edge direction using various methods such as pixel gradient and local similarity. In an example embodiment, the main edge estimator 110 may estimate the main edge direction using a pixel gradient as represented in Equation 1.

$$\nabla H(y, x) = |G(y, x-1) - G(y, x+1)|$$
$$\nabla V(y, x) = |G(y-1, x) - G(y+1, x)|$$
Equation 1

In Equation 1, $\nabla H(y,x)$ corresponds to the gradient in the horizontal direction and $\nabla V(y,x)$ corresponds to the gradient in the vertical direction.

For example, the main edge estimator 110 may estimate the main edge direction as the vertical direction VER when $\nabla H(y,x) > \nabla V(y,x)$ and $|\nabla H(y,x) - \nabla V(y,x)| > k$, and estimate the main edge direction as the horizontal direction HOR when the horizon $\nabla H(y,x) < \nabla V(y,x)$ and $|\nabla H(y,x) - \nabla V(y,x)| > k$. The main edge estimator 110 may determine that there is no edge, or estimate the main edge direction as the non-direction when $|\nabla H(y,x) - \nabla V(y,x)| < k$. Here, k may be a value that is a criterion for determining whether an edge exists.

When the main edge direction is estimated in this way, the performance of edge direction detection may be degraded due to the limitation of the sampling rate for each direction in the high-frequency edge, an example of which is described below with reference to FIGS. 9A and 9B.

Figures 9A, 9B:
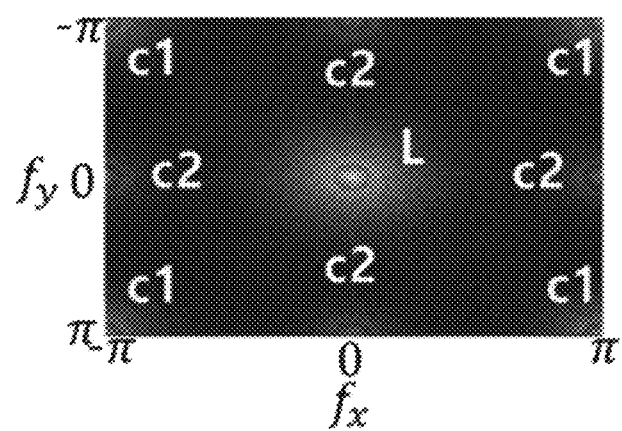
FIGS. 9A and 9B are diagrams for describing a high-frequency edge enhancement of a demosaicing method according to an embodiment.
Figure 10A:
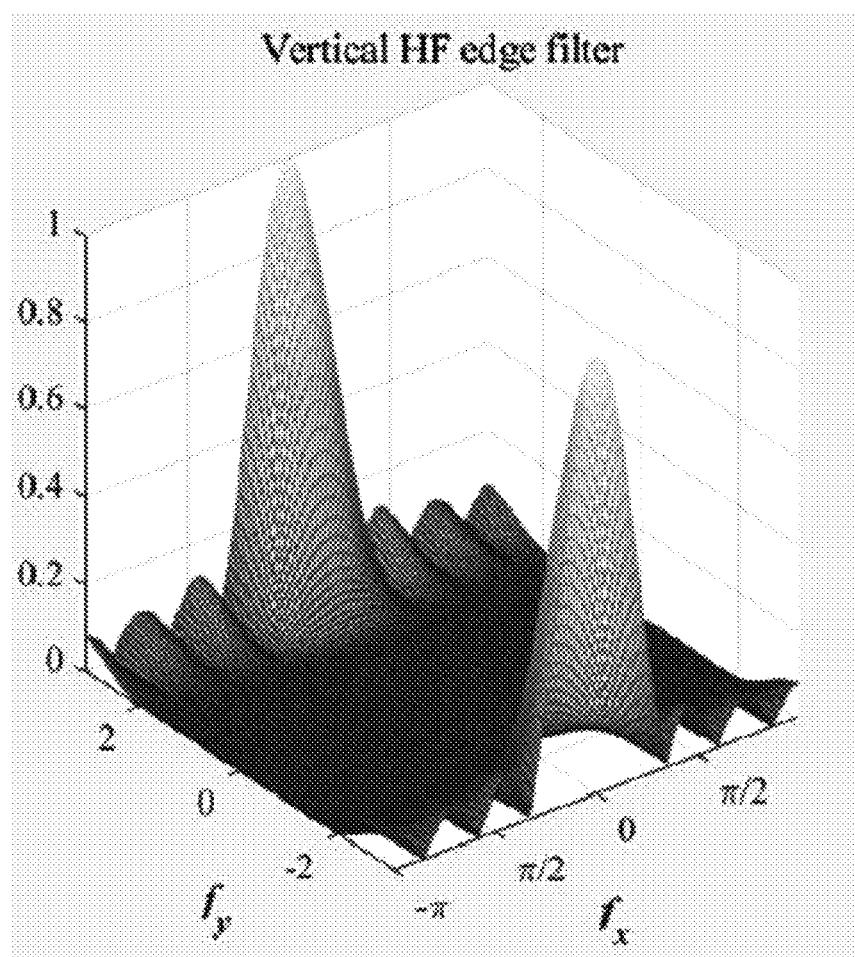
FIGS. 10A and 10B are diagrams of high-frequency filters included in the main edge enhance of FIG. 6, according to embodiments.
Figure 10B:
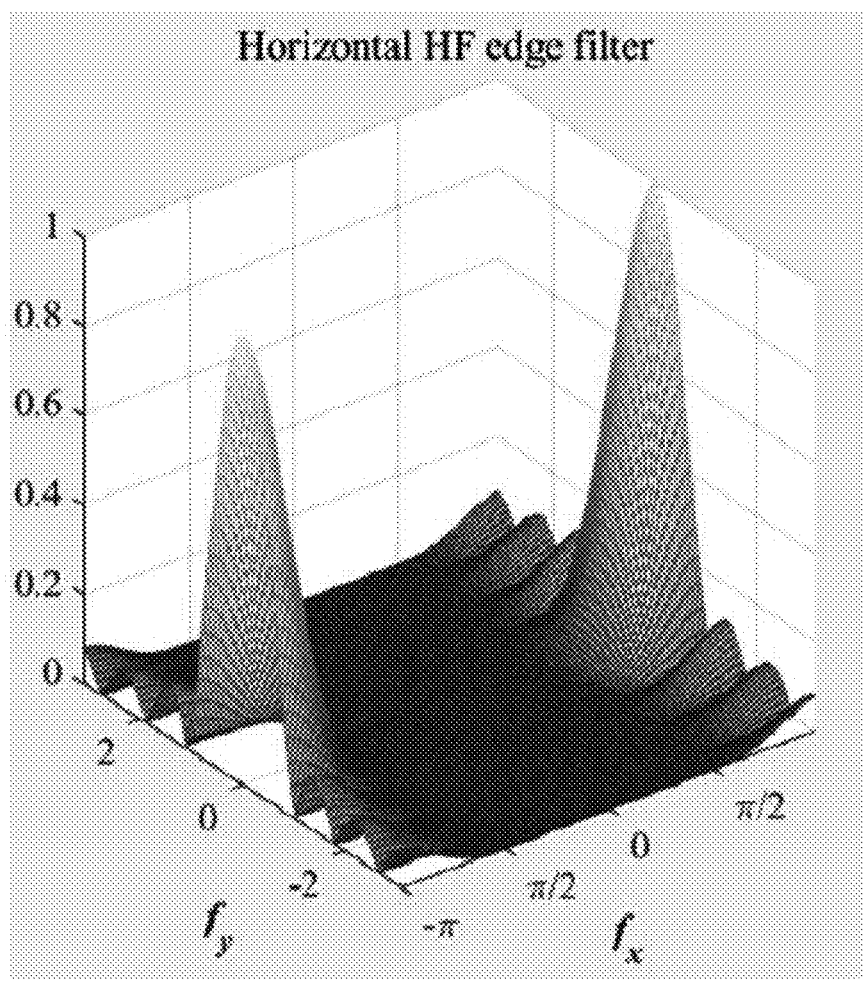

FIGS. 9A and 9B are diagrams for describing a high-frequency edge enhancement of a demosaicing method according to example embodiments, and FIGS. 10A and 10B are diagrams illustrating example embodiments of high-frequency filters included in the main edge enhancer 120 of FIG. 6.

$\nabla H$ and $\nabla V$ calculated as Equation 1 may be regarded as a high-frequency signal having a frequency of $\pi/2$, because it may be performed based on the difference between pixel values of the same color. This may mean that directional distortion may occur for a signal having a frequency of $\pi$.

FIG. 9A shows a Bayer image and FIG. 9B shows a frequency response for the Bayer image of FIG. 9A. The components of the frequency domain may be expressed as in Equation 2.

$$L = R + 2G + B$$
$$c1 = -R + 2G - B$$
$$c2 = -R + B$$
Equation 2

In Equation 2 above, L may denote a luma component, c1 may denote a first chroma component, and c2 may denote a second chroma component. Referring to Equation 2, in the case of the high-frequency image signal c2 in the horizontal and vertical directions, L components of $f_x = \pm \pi$ or $f_y = \pm \pi$ may be extracted in the case of $-R+B=0$. For example, directionality may be extracted for edges having frequencies of $\pi$ in the horizontal and vertical directions in the situation of B=R.

To identify high-frequency components in the horizontal and vertical directions, the input mosaic image Im may be filtered for each sub target pixel STP using the vertical high-frequency filter 121 and the horizontal high-frequency filter 122 of FIG. 6 to generate the vertical filter value Vvf and the horizontal filter value Vhf. For example, the vertical high-frequency filter 121 and the horizontal high-frequency filter 122 may have shapes as shown in FIGS. 10A and 10B.

The high-frequency edge estimator 124 of FIG. 6 may determine the high-frequency edge direction Dhf(y,x) at a pixel (y,x) as the horizontal direction HOR when the vertical filter value Vvf(y,x) is greater than the horizontal filter value Vhf(y,x) and determine the high-frequency edge direction Dhf(y,x) as the vertical direction VER when the horizontal filter value Vhf(y,x) is greater than the vertical filter value Vvf(y,x). In addition, the high-frequency edge estimator 124 may estimate the high-frequency edge direction Dhf only when the difference |Vvf−Vhf| between the vertical filter value Vvf(y,x) and the horizontal filter value Vhf(y,x) is greater than the threshold value TH. In embodiments, when the difference |Vvf−Vhf| is smaller than the threshold value TH, the high-frequency edge direction Dhf may be determined as the non-direction.

To determine whether the condition of c2=0 mentioned in Equation 2 is approximated, it may be determined whether to perform directional enhancement by measuring directional chrominance values. Examples of measurement of directional chrominance values are described below with reference to FIGS. 12 and 13. As a result, when approaching the condition of c2=0, the estimated main edge direction Dintp' may be reinforced and/or enhanced, an example of which is described below with reference to FIG. 11.

Figure 11:
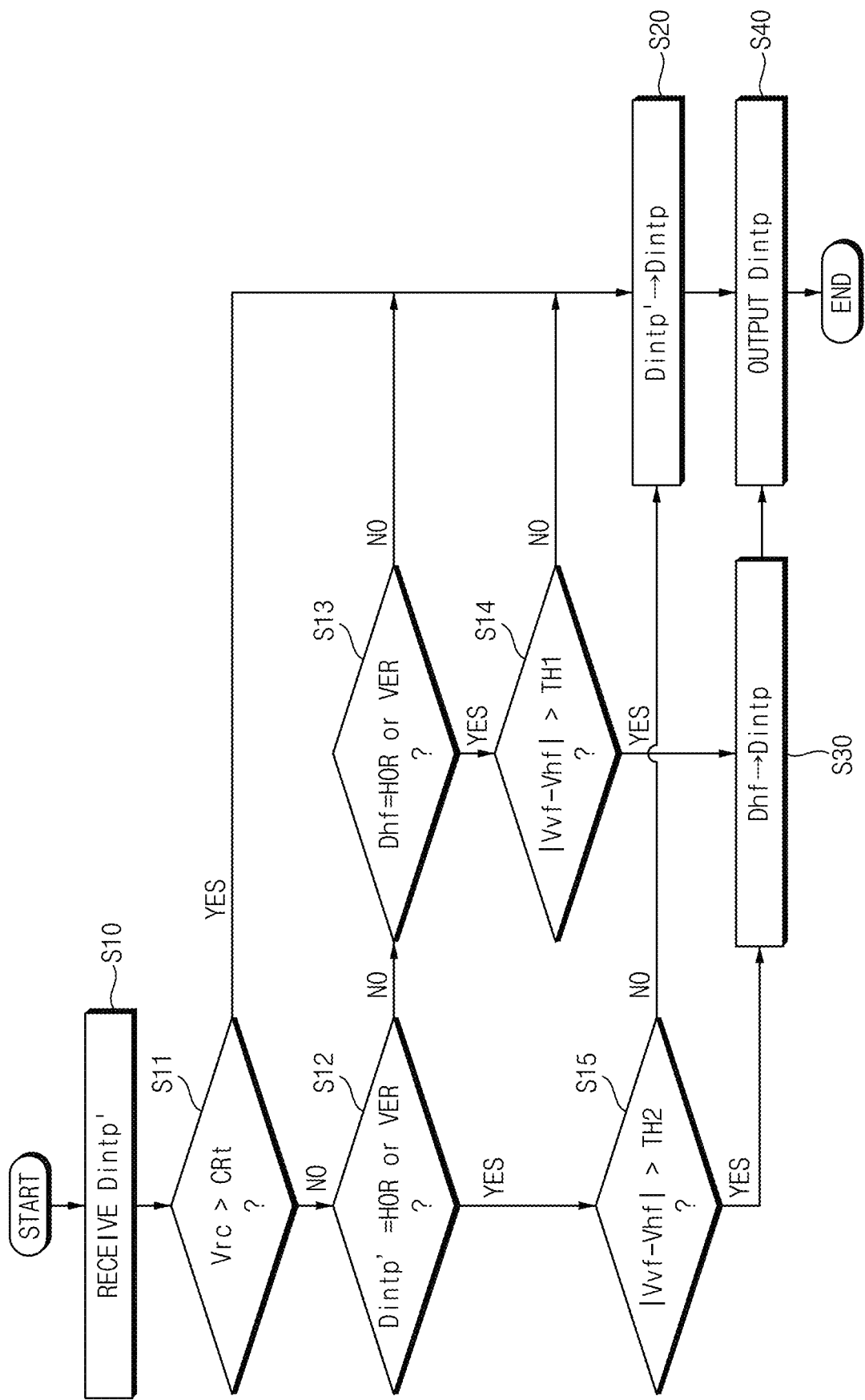
FIG. 11 is a flow chart illustrating an example embodiment of a high-frequency edge enhancement of a demosaicing method according to an embodiment.

FIG. 11 is a flow chart illustrating an example embodiment of high-frequency edge enhancement of a demosaicing method according to example embodiments.

Referring to FIGS. 1, 6, and 11, the update determiner 125 may receive the estimated main edge direction Dintp' for each sub target pixel STP from the main edge estimator 110 at operation S10. In addition, the update determiner 125 may receive the high-frequency edge direction Dhf for each sub target pixel STP from the high-frequency edge estimator 124, and receive the reference chrominance value Vrc for each sub target pixel STP from the chrominance generator 123, and receive vertical filter value Vvf and the horizontal filter value Vhf for each sub target pixel STP from the vertical high-frequency filter 121 and the horizontal high-frequency filter 122.

The update determiner 125 may determine whether the reference chrominance value Vrc is greater than the threshold chrominance value CRt at operation S11.

When the reference chrominance value Vrc is greater than the threshold chrominance value CRt (YES at operation S11, the update determiner 125 may determine the estimated main edge direction Dintp' as the final main edge direction Dintp at operation S20, and output the final main edge direction Dintp at operation S40. As such, when the reference chrominance value Vrc is greater than the threshold chrominance value CRt, for example when it is determined that each sub target pixel STP corresponds to the chrominance region, the update determiner 125 may maintain the estimated main edge direction Dintp' without replacement with the high-frequency edge direction Dhf.

When the reference chrominance value Vrc is smaller than the threshold chrominance value CRt (NO at operation at S11), the update determiner 125 may determine whether the estimated main edge direction Dintp' is one of the horizontal direction HOR and the vertical direction VER at operation S12.

When the estimated main edge direction Dintp' is not one of the horizontal direction HOR and the vertical direction VER (NO at operation S12), for example when the high-frequency edge direction Dintp' is the non-direction, the update determiner 125 may determine whether the high-frequency edge direction Dhf is one of the horizontal direction HOR and the vertical direction VER at operation S13.

When the high-frequency edge direction Dhf is not one of the horizontal direction HOR and the vertical direction VER (NO at operation S13), for example when the high-frequency edge direction Dhf is the non-direction, the update determiner 125 may determine the estimated high-frequency edge direction Dhf and the final main edge direction Dintp at operation S20, and output the final main edge direction Dintp at operation S40. For example, the update determiner 125 may determine the final main edge direction Dintp as the non-direction when both the estimated main edge direction Dintp' and the high-frequency edge direction Dhf are the non-direction.

When the high-frequency edge direction Dhf is the horizontal direction HOR or the vertical direction VER (YES at operation S13), the update determiner 125 may compare a difference |Vvf−Vhf| between the vertical filter value Vvf (y,x) and the horizontal filter value Vhf(y,x) with a first threshold value Th1 at operation S14.

When the difference |Vvf−Vhf| between the vertical filter value Vvf(y,x) and the horizontal filter value Vhf(y,x) is smaller than the first threshold value Th1 (NO at operation S14), for example when the reliability of the high-frequency edge direction Dhf is low, the update determiner 125 may determine the estimated main edge direction Dintp' as the final main edge direction Dintp at operation S20, and output the final main edge direction Dintp at operation S40.

When the difference |Vvf−Vhf| between the vertical filter value Vvf(y,x) and the horizontal filter value Vhf(y,x) is greater than the first threshold value Th1 (YES at operation S14, for example when the reliability of the high-frequency edge direction Dhf is high, the update determiner 125 may replace the final main edge direction Dintp with the high-frequency edge direction Dhf at operation S30, and output the high-frequency edge direction Dhf as the final main edge direction Dintp at operation S40.

Accordingly, the update determiner 125 may replace the main edge direction Dintp with the high-frequency edge direction Dhf, when the reference chrominance value Vrc is smaller than the threshold chrominance value CRt, the estimated main edge direction Dintp' is the horizontal direction HOR or the vertical direction VER, and the difference |Vvf−Vhf| between the vertical filter value Vvf and horizontal filter value Vhf is greater than the first threshold value TH1.

When the estimated main edge direction Dintp' is one of the horizontal direction HOR and the vertical direction VER (YES at operation S12), the update determiner 125 may compare the difference |Vvf−Vhf| between the vertical filter value Vvf(y,x) and the horizontal filter values Vhf(y,x) with a second threshold value TH2 at operation S15. In an example embodiment, the second threshold value TH2 may be set higher than the first threshold value TH1.

When the difference |Vvf−Vhf| between the vertical filter value Vvf(y,x) and the horizontal filter value Vhf(y,x) is smaller than the second threshold value TH2 (NO at operation S15), for example when the reliability of the high-frequency edge direction Dhf is low, the update determiner 125 may determine the estimated main edge direction Dintp' as the final main edge direction Dintp at operation S20, and output the final main edge direction Dintp at operation S40.

When the difference |Vvf−Vhf| between the vertical filter value Vvf(y,x) and the horizontal filter value Vhf(y,x) is greater than the second threshold value Th1 (YES at operation S15), for example when the reliability of the high-frequency edge direction Dhf is high, the update determiner 125 may replace the final main edge direction Dintp with the high-frequency edge direction Dhf at operation S30, and output the high-frequency edge direction Dhf as the final main edge direction Dintp at operation S40.

Accordingly, the update determiner 125 may replace the final main edge direction Dintp with the high-frequency edge direction Dhf, when the reference chrominance value Vrc is smaller than the threshold chrominance value CRt, the estimated main edge direction Dintp' is the non-direction, and the difference |Vvf−Vhf| between the vertical filter value Vvf and the horizontal filter value Vhf is greater than the second threshold value TH2.

As described above, the update determiner 125 of the main edge enhancer 120 may determine whether to replace the estimated main edge direction Dintp' with the high-frequency edge direction Dhf based on the vertical filter value Vvf, the horizontal filter value Vhf, and the reference chrominance value Vrc.

Figure 12:
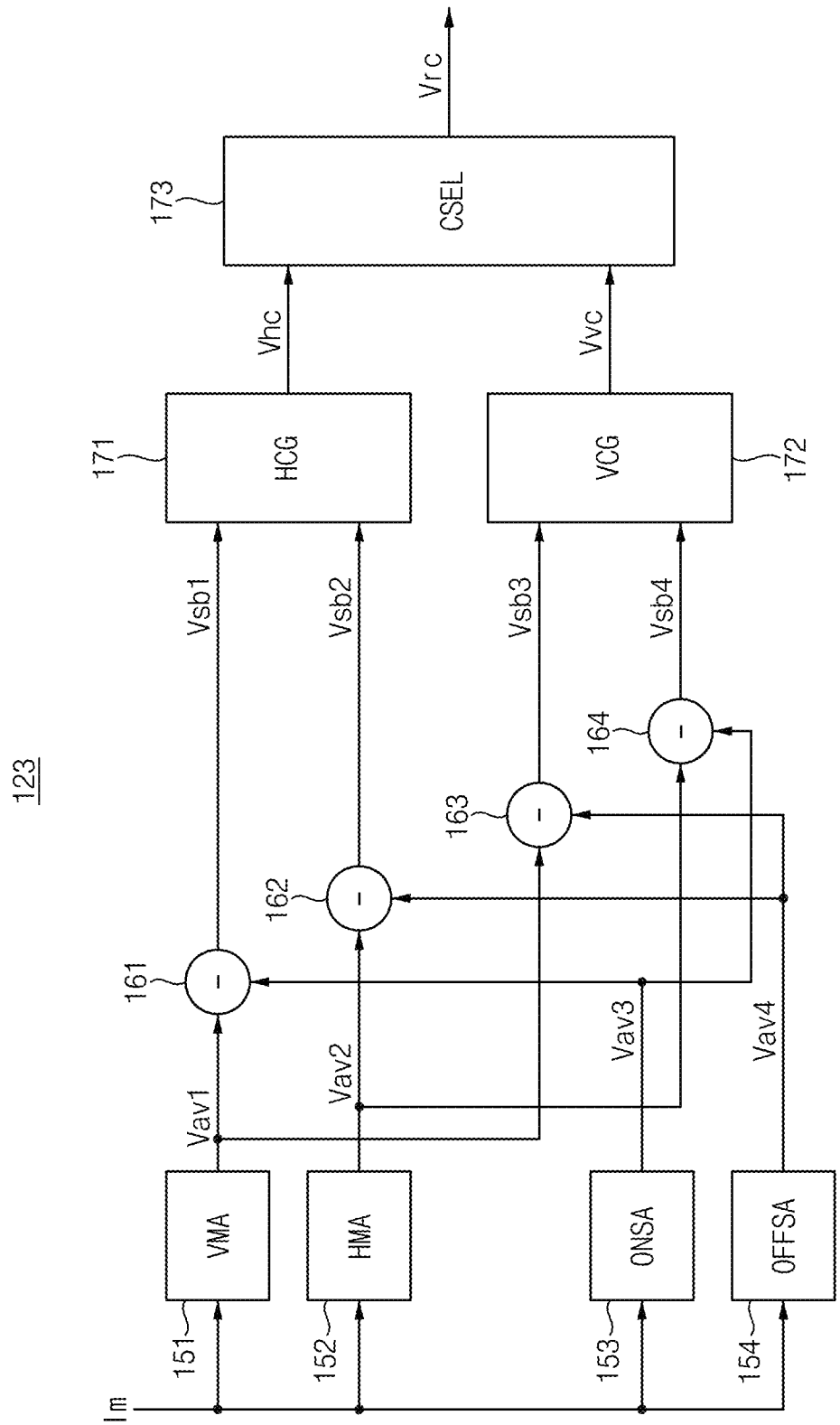
FIG. 12 is a block diagram illustrating a chrominance generator included in the main edge enhancer of FIG. 6, according to an embodiment.

FIG. 12 is a block diagram illustrating an example embodiment of a chrominance generator included in the main edge enhancer of FIG. 6.

Referring to FIG. 12, a chrominance generator 123 may include a first filter 151 (illustrated as "VMA"), a second filter 152 (illustrated as "HMA"), a third filter 153 (illustrated as "ONSA"), a fourth filter 154 (illustrated as "OFFSA"), a first subtraction unit 161, a second subtraction unit 162, a third subtraction unit 163, a fourth subtraction unit 164, a horizontal chrominance generator 171 (illustrated as "HCG"), a vertical chrominance generator 172 (illustrated as "VCG"), and a chrominance selector 173 (illustrated as "CSEL").

The first filter 151 may generate a first average value Vav1 by calculating an average of green pixel values of the input mosaic image Im in a vertical direction. The second filter 152 may generate a second average value Vav2 by calculating an average of green pixel values of the input mosaic image Im in a horizontal direction.

The third filter 153 may generate a third average value Vav3 by calculating an average of on-color pixel values of the input mosaic image Im. The fourth filter 154 may generate a fourth average value Vav4 by calculating an average of off-color pixel values of the input mosaic image Im. Here, the on-color may refer to a sub color corresponding to each sub target pixel STP, and the off-color may refer to a sub color not corresponding to the on-color. For example, if the currently processed sub target pixel STP corresponds to the red color, the on-color pixel values may correspond to red pixel values and the off-color pixel values may correspond to blue pixel values. Conversely, if the currently processed sub target pixel STP corresponds to the blue color, the on-color pixel values may correspond to the blue pixel values and the off-color pixel values may correspond to the red pixel values.

The first subtraction unit 161 may generate a first difference value Vsb1 by calculating a difference between the first average value Vav1 and the third average value Vav3. The second subtraction unit 162 may generate a second difference value Vsb2 by calculating the difference between the second average value Vav2 and the fourth average value Vav4. The third subtraction unit 161 may generate a third difference value Vsb3 by calculating the difference between the first average value Vav1 and the fourth average value Vav4. The fourth subtraction unit 164 may generate a fourth difference value Vsb4 by calculating the difference between the second average value Vav1 and the third average value Vav3.

The horizontal chrominance generator 171 may generate the horizontal chrominance value Vhc based on the first difference value Vsb1 and the second difference value Vsb2. For example, the horizontal chrominance generator 171 may select a larger value from among the first difference value Vsb1 and the second difference value Vsb2 and perform a max pooling operation, low pass filtering, or the like on a constant pixel window (or kernel), to generate the horizontal chrominance value Vhc.

The vertical chrominance generator 172 may generate the vertical chrominance value Vhc based on the third difference value Vsb3 and the fourth difference value Vsb4. For example, the vertical chrominance generator 172 may select a larger value from among the first difference value Vsb1 and the second difference value Vsb2 and perform a max pooling operation, low pass filtering, or the like on a constant pixel window (or kernel), to generate the vertical chrominance value Vvc.

The chrominance selector 173 may determine the reference chrominance value Vrc to be transferred to the update determiner 125 of FIG. 6 based on the horizontal chrominance value Vhc and the vertical chrominance value Vvc.

Figure 13:
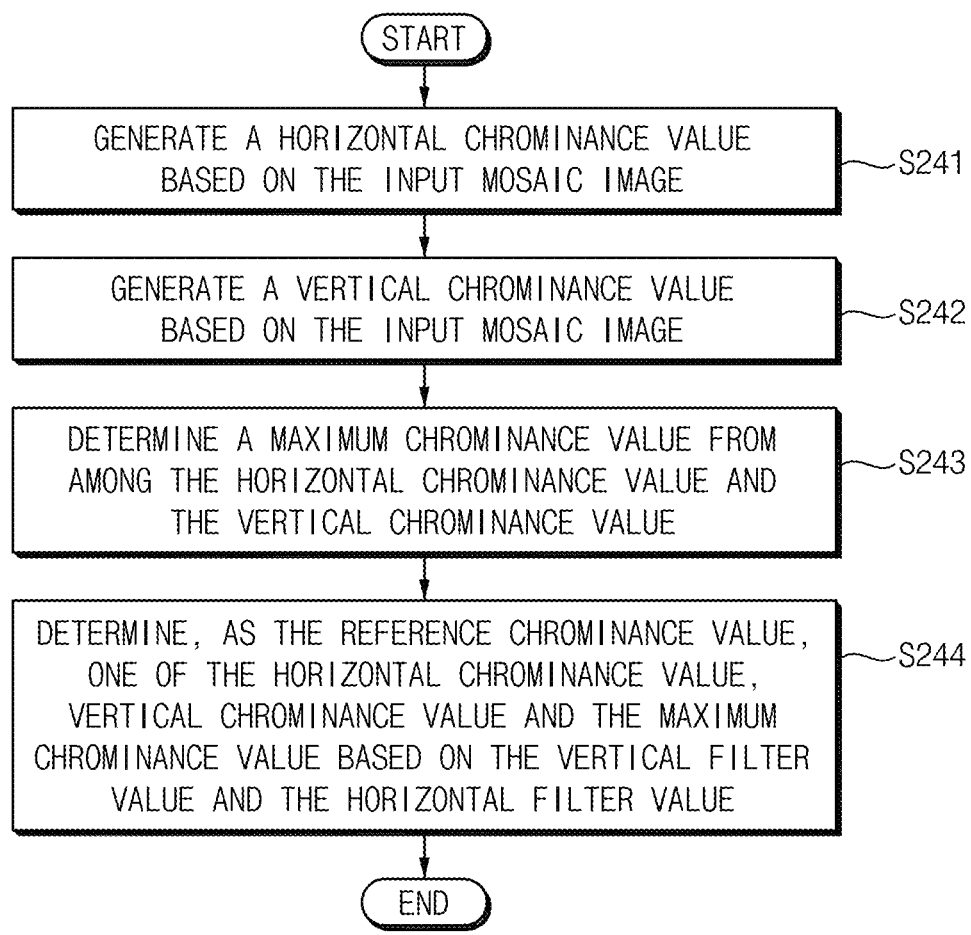
FIG. 13 is a flowchart illustrating an example embodiment of chrominance generation of a demosaicing method according to an embodiment.

FIG. 13 is a flowchart illustrating an example embodiment of chrominance generation of a demosaicing method according to example embodiments.

Referring to FIGS. 12 and 13, the chrominance generator 123 may generate a horizontal chrominance value Vhc based on the input mosaic image Im at operation S241. Also, the chrominance generator 123 may generate a vertical chrominance value Vvc based on the input mosaic image Im at operation S242.

The chrominance generator 123 may determine a maximum chrominance value from among the horizontal chrominance value Vhc and the vertical chrominance value Vvc at operation S243.

The chrominance selector 173 may determine, as the reference chrominance value Vrc, one of the horizontal chrominance value Vhc, the vertical filter value Vhc and maximum chrominance value based on the vertical filter value Vvf and the horizontal filter value Vhf transferred from the vertical high frequency filter 121 and the horizontal high frequency filter 122 of FIG. 6.

For example, the chrominance selector 173 may determine the vertical chrominance value Vvc as the reference chrominance value Vrc when the vertical filter value Vvf is significantly greater than the horizontal filter value Vhf, and may determine the horizontal filter value Vrc as the reference chrominance value Vrc when the horizontal filter value Vhf is significantly greater than the vertical filter value Vvf. When the difference between the horizontal filter value Vhf and the vertical filter value Vvf is smaller than the predetermined reference value, the chrominance selector 173 may determine the maximum chrominance value as the reference chrominance value Vrc.

Figure 14:
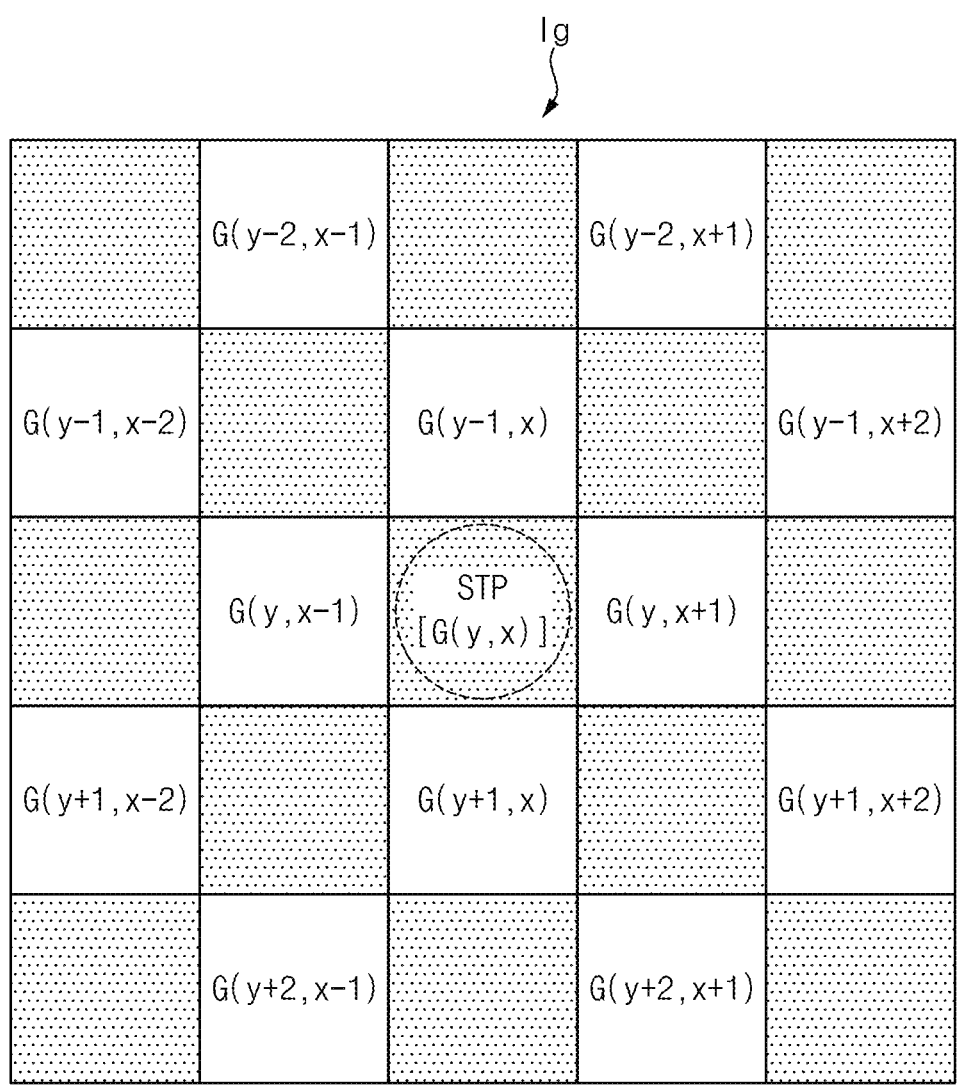
FIG. 14 is a diagram illustrating a main color mosaic image corresponding to the input mosaic image of FIG. 3, according to an embodiment.

FIG. 14 is a diagram illustrating a main color mosaic image corresponding to the input mosaic image of FIG. 3.

FIG. 14 illustrates a green mosaic image Ig corresponding to the main color mosaic image in the case of a Bayer pattern. The green mosaic image Ig includes green pixel values G corresponding to the main color of the input mosaic image Im of FIG. 3.

Hereinafter, an example of obtaining a green pixel value G(y,x) by performing the main interpolation on the sub target pixel STP corresponding to the red pixel value R(y,x) of the input mosaic image Im is described.

According to embodiments, interpolation based on color differences ($K_R$, $K_B$) as expressed in Equation 3 may be used, however embodiments are not limited thereto.

$$KR = G-R \qquad \text{Equation 3}$$
$$KB = G-B$$

In embodiments, the color difference may not have an extreme change in a local area, and this property may be very suitable for interpolation. When the Bayer input has a red pixel value R at the position (y,x), interpolation of the green pixel value G may be represented as in Equation 4.

$$G(y, x) = R(y, x) + \frac{K_R^n(y, x) + K_R^s(y, x) + K_R^w(y, x) + K_R^e(y, x)}{4} \qquad \text{Equation 4}$$

Here, $K_R^n$, $K_R^s$, $K_R^w$, $K_R^e$ may denote directional color difference values for the red pixel value R, and may denote directionality of the upper direction Dn, the lower direction Ds, the left direction Dw, and the right direction De shown in FIG. 3, respectively, which may be represented as in Equation 5.

$$K_R^n(y, x) = G(y-1, x) - \frac{R(y, x) + R(y-2, x)}{2} \qquad \text{Equation 5}$$
$$K_R^s(y, x) = G(y+1, x) - \frac{R(y, x) + R(y+2, x)}{2}$$
$$K_R^w(y, x) = G(y, x-1) - \frac{R(y, x) + R(y, x-2)}{2}$$
$$K_R^e(y, x) = G(y, x+1) - \frac{R(y, x) + R(y, x+2)}{2}$$

In the case of interpolation in consideration of edge directionality to improve image quality, only directional color difference values for a corresponding direction may be used. For example, Equation 6 may be used when the main edge direction Dintp is the horizontal direction HOR, and Equation 7 may be used when the main edge direction Dintp is the vertical direction VER. When the main edge direction Dintp is the non-direction, Equation 4 may be used.

$$G(y, x) = R(y, x) + \frac{K_R^w(y, x) + K_R^e(y, x)}{2} \quad \text{Equation 6}$$

$$G(y, x) = R(y, x) + \frac{K_R^n(y, x) + K_R^s(y, x)}{2} \quad \text{Equation 7}$$

When using uniform average values as in Equation 6 and Equation 7, for example, if there is an edge between (y,x) and (y−2,x), unintended color distortion may occur.

Therefore, embodiments may relate to a method of estimating the directional color difference value based on the gradient and Laplacian. Hereinafter, an upper direction color difference value $K_R^n(y,x)$ with respect to red color R and the upper direction Dn is described as a representative example. A gradient-based directional color difference value according to example embodiments may be represented as in Equation 8.

$$K_R^n(y, x) = \quad \text{Equation 8}$$
$$G(y-1, x) - \{\widetilde{R_c}(y, x)\alpha_R^n(y, x) + \widetilde{R_{nn}}(y, x)(1 - \alpha_R^n(y, x))\}$$

The first coefficient value $\alpha_R^n(y,x)$ of Equation 8 may be expressed as Equation 9 as a gradient $\delta_R^n(G)$ for green pixel values in the upper direction Dn.

$$\alpha_R^n(y, x) = \delta_R^n(G) = |G(y-1, x) - G(y-3, x)| \quad \text{Equation 9}$$

In embodiments, the adaptive red pixel values $\widetilde{R_c}(y,x)$ and $\widetilde{R_{nn}}(y,x)$ of Equation 8 may be expressed as Equation 10.

$$\widetilde{R_c}(y, x) = R(y, x)\beta_n(y, x) + R(y-2, x)(1 - \beta_n(y, x)) \quad \text{Equation 10}$$
$$\widetilde{R_{nn}}(y, x) = R(y, x)(1 - \beta_n(y, x)) + R(y-2, x)\beta_n(y, x)$$

The second coefficient value $\beta_R^n(y,x)$ of Equation 10 may be expressed as Equation 11 as a product of the gradient $\delta_R^n(R)$ of red pixel values in the upper direction Dn and the Laplacian $L_R^n$ in the upper direction Dn.

$$\beta_R^n(y, x) = \delta_R^n(R)L_R^n = \quad \text{Equation 11}$$
$$|R(y, x) - R(y-2, x)||R(y, x) - 2G(y, x) + R(y-2, x)|$$

The upper color difference value $K_R^n(y,x)$ for the upper direction Dn is described referring to Equations 8 through 11, with respect to the sub target pixel STP corresponding to the red pixel value R(y,x) of the input mosaic image Im. In the same way, the lower color difference value $K_R^s(y,x)$ for the lower direction Ds, the left color difference value $K_R^w(y,x)$ for the left direction Dw, and the right color difference value $K_R^e(y,x)$ for the right direction De may be obtained.

Accordingly, with respect to each sub target pixel STP, an upper coefficient value, a lower coefficient value, a left coefficient value, and a right coefficient value may be generated based on the gradient of the input mosaic image Im. Each of the upper coefficient value, the lower coefficient value, the left coefficient value, and the right coefficient value may include a first coefficient value and a second coefficient value. As shown in Equation 9, the first coefficient value may correspond to a gradient of the main color pixel values of neighboring pixels adjacent to each sub target pixel STP. As shown in Equation 11, the second coefficient value may correspond to a product of a gradient of the first sub color pixel values or the second sub color pixel values of the neighboring pixels and a Laplacian of pixel values of each sub target pixel and the neighboring pixels.

The upper color difference value $K_R^n(y,x)$, the lower color difference value $K_R^s(y,x)$, the left color difference value $K_R^w(y,x)$, and the right color difference value $K_R^e(y,x)$ may be generated based on the upper coefficient value, the lower coefficient value, the left coefficient value, and the right coefficient value.

Based on the directional color difference values calculated as above, interpolation may be performed on the green pixel value G(y,x).

The main color pixel value G(y,x) corresponding to each sub target pixel STP may be generated based on the chrominance values corresponding to the main edge direction Dintp among the upper color difference value $K_R^n(y,x)$, the lower color difference value $K_R^s(y,x)$, the left color difference value $K_R^w(y,x)$, and the right color difference value $K_R^e(y,x)$.

When the main edge direction Dintp is the vertical direction VER, the main color pixel value G(y,x) corresponding to each sub target pixel STP may be generated based on the upper color difference value $K_R^n(y,x)$ and the lower color difference value $K_R^s(y,x)$ as shown in Equation 6.

When the main edge direction Dintp is the horizontal direction HOR, as shown in Equation 7, the main color pixel value (G(y,x)) corresponding to each sub target pixel STP may be generated based on the left color difference value $K_R^w(y,x)$, and the right color difference value $K_R^e(y,x)$.

In embodiments, when the main edge direction Dintp is the non-direction, as shown in Equation 4, the main color pixel value (G(y,x)) corresponding to each sub target pixel STP may be generated based on upper color difference value $K_R^n(y,x)$, the lower color difference value $K_R^s(y,x)$, the left color difference value $K_R^w(y,x)$, and the right color difference value $K_R^e(y,x)$.

Equations 4, 6, and 7 show that interpolated main color pixel values may be obtained based on a simple average of directional color difference values, but example embodiments are not limited thereto.

In an embodiment, direction weight values may be generated based on a gradient of pixel values of neighboring pixels adjacent to each sub target pixel STP. A weighted average value of the color difference values corresponding to the main edge direction Dintp may be generated based on the direction weight values. A main color pixel value corresponding to each sub target pixel STP may be generated based on the weighted average value and the main color pixel value of the neighboring pixels.

When the main edge direction Dintp is the vertical direction VER, the interpolated main color pixel value G(y,x) may be obtained based on weighted average value Wav of the upper color difference value Kn and the lower color difference value Ks as Equation 12.

$$G(y, x) = I(y, x) + WAv = I(y, x) + \frac{\omega_n K_n + \omega_s K_s}{\omega_n + \omega_s} \quad \text{Equation 12}$$

When the main edge direction Dintp is the horizontal direction HOR, as shown in Equation 13, the interpolated main color pixel value G(y,x) may be obtained based on the weighted average value WAh of the left color difference Kw and the right color difference Ke (y,x).

$$G(y, x) = I(y, x) + WAh = I(y, x) + \frac{\omega_w K_w + \omega_e K_e}{\omega_w + \omega_e} \quad \text{Equation 13}$$

When the main edge direction Dintp is the non-direction, as shown in Equation 14, the interpolated main color pixel value G(y,x) may be obtained based on the weighted average value WA of the upper color difference value Kn, the lower color difference value Ks, the left color difference value Kw, and the right color difference value Ke.

$$G(y, x) = I(y, x) + WA = I(y, x) + \frac{\omega_n K_n + \omega_s K_s + \omega_w K_w + \omega_e K_e}{\omega_n + \omega_s + \omega_w + \omega_e} \quad \text{Equation 14}$$

In Equations 12, 13 and 14, ωn, ωs, ωw, and ωe, may be obtained as the direction weight values corresponding to each direction based on the gradients of the neighboring pixels adjacent to each sub target pixel STP in each direction.

In addition, with respect to the sub target pixel STP corresponding to the blue pixel value B(y,x) of the input mosaic image Im, the upper color difference value $K_B^n(y,x)$ with respect to the upper direction Dn, the lower color difference value $K_B^s(y,x)$ with respect to the lower direction Ds, the left color difference value $K_B^w(y,x)$ with respect to the left direction Dw, and the right color difference value $K_B^e(y,x)$ with respect to the right direction De may be obtained.

Figure 15:
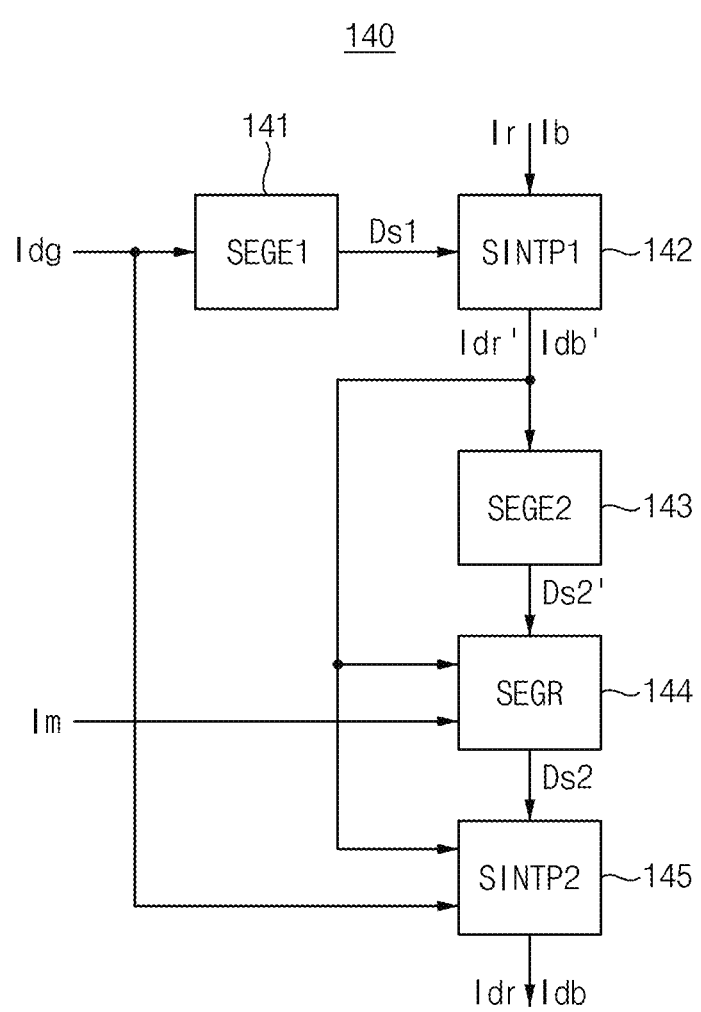
FIG. 15 is a block diagram illustrating an example embodiment of a sub interpolator included in a demosaicing device according to an embodiment.
Figure 16:
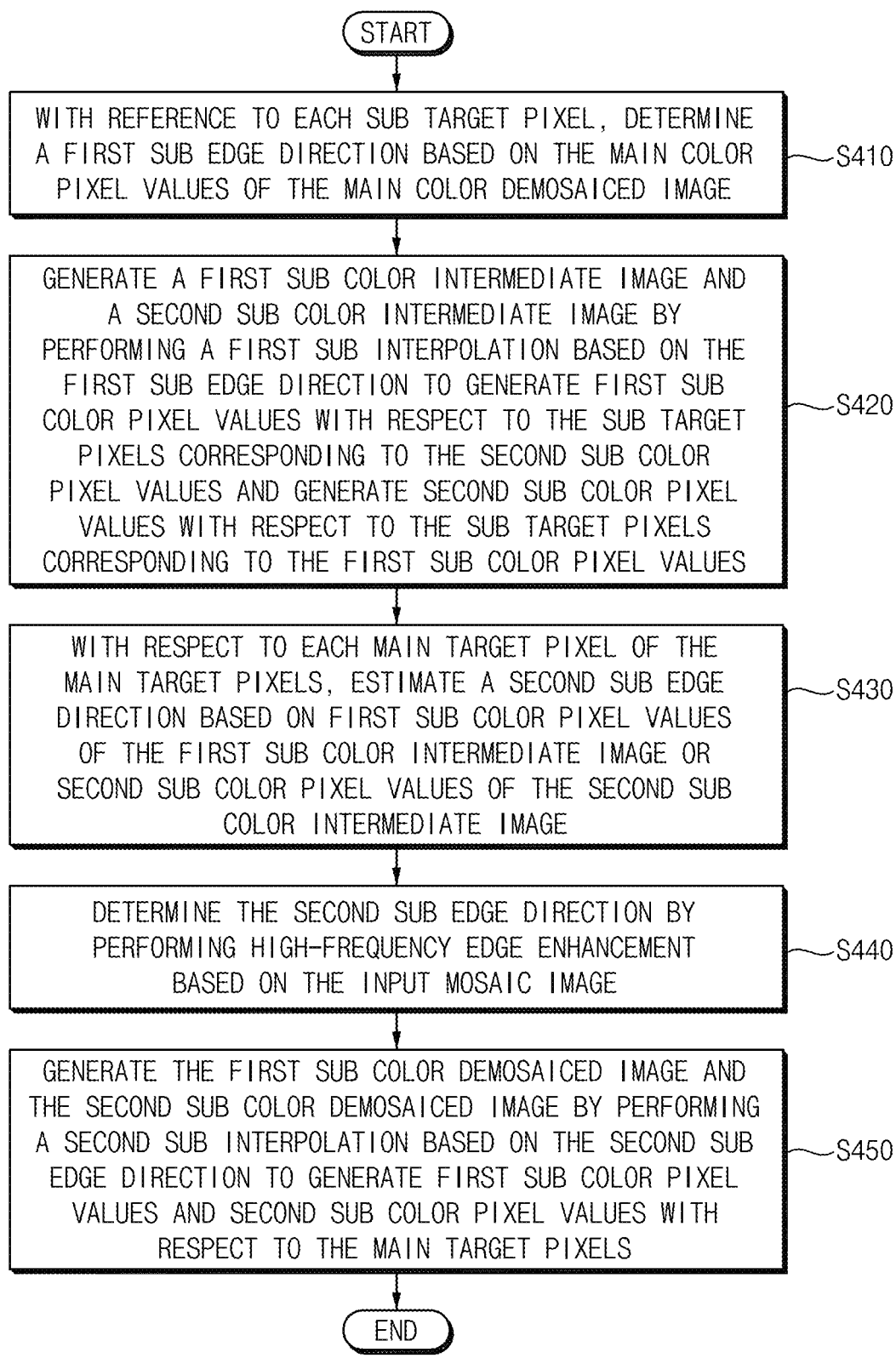
FIG. 16 is a flow chart illustrating an example embodiment of sub interpolation of a demosaicing method according to an embodiment.

FIG. 15 is a block diagram illustrating an example embodiment of a sub interpolator included in a demosaicing device according to example embodiments, and FIG. 16 is a flow chart illustrating an example embodiment of sub interpolation of a demosaicing method according to example embodiments.

Referring to FIG. 15, the sub interpolator 140 may include a first sub edge estimator 141 (illustrated as "SEGE1"), a first interpolator 142 (illustrated as "SINTP1"), a second sub edge estimator 143 (illustrated as "SEGE2"), a sub edge enhancer 144 (illustrated as "SEGR"), and a second interpolator 145 (illustrated as "SINTP2").

Referring to FIGS. 15 and 16, the first sub edge estimator 141 may, with reference to each sub target pixel STP, determine a first sub edge direction based on the main color pixel values of the main color demosaiced image Idg at operation S410).

The first interpolator 142 may generate a first sub color intermediate image Idr' and a second sub color intermediate image Idb' by performing a first sub interpolation based on the first sub edge direction to generate first sub color pixel values R with respect to the sub target pixels corresponding to the second sub color pixel values B of the input mosaic image Im, and generate second sub color pixel values B with respect to the sub target pixels corresponding to the first sub color pixel values R of the input mosaic image Im at operation S420.

The second sub edge estimator 143 may, with respect to each main target pixel MTP of the main target pixels, estimate a second sub edge direction based on first sub color pixel values R of the first sub color intermediate image Idr' or second sub color pixel values B of the second sub color intermediate image Idb' at operation S430.

The sub edge enhancer 144 may determine the second sub edge direction by performing high-frequency edge enhancement based on the input mosaic image Im at operation S440.

The second interpolator 145 may generate the first sub color demosaiced image Idr and the second sub color demosaiced image Idb by performing a second sub interpolation based on the second sub edge direction to generate first sub color pixel values R and second sub color pixel values B with respect to the main target pixels MTP at operation S450.

Figure 17:
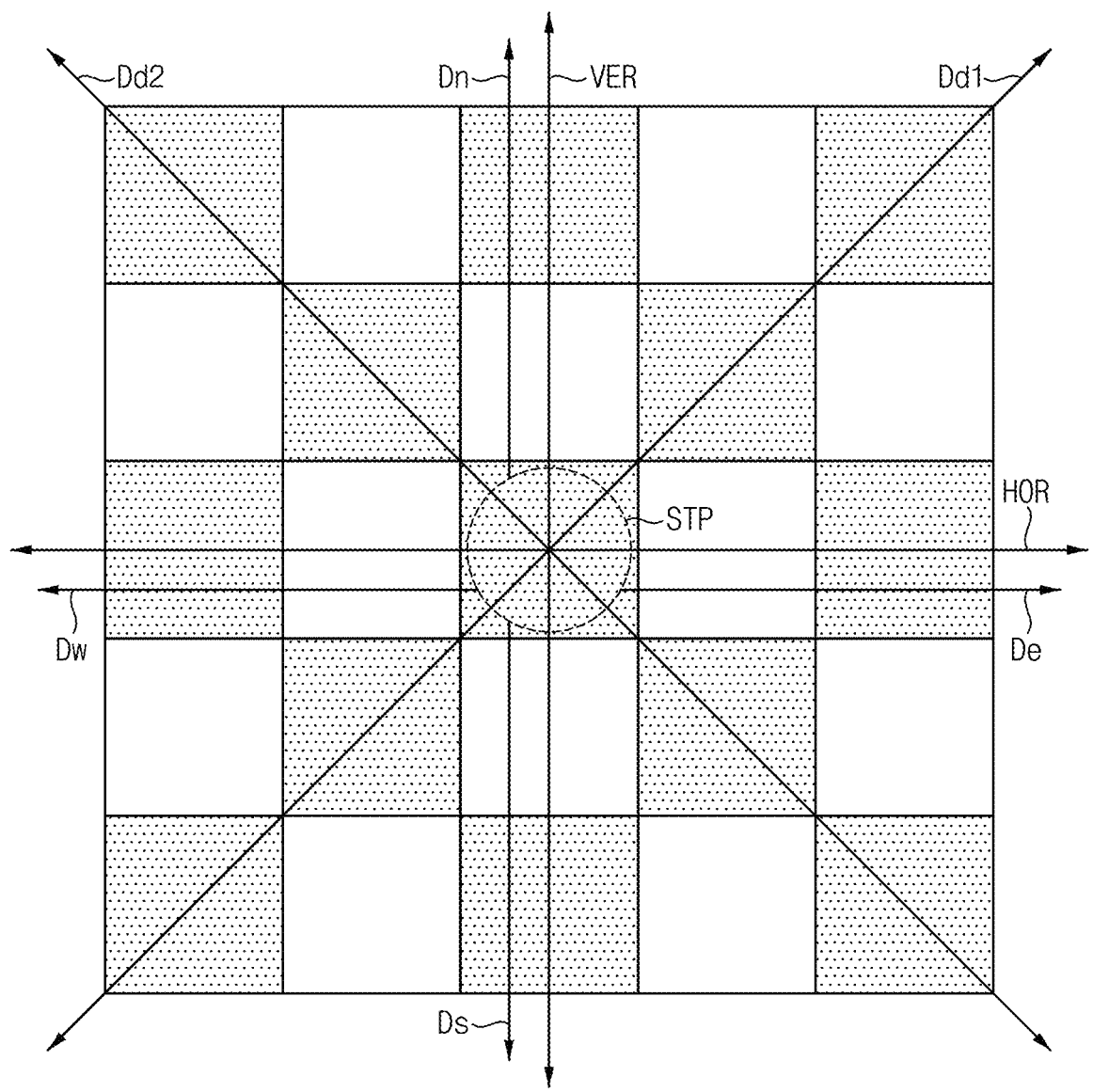
FIG. 17 is a diagram illustrating an edge direction for a sub interpolation of a demosaicing method according to an embodiment.

FIG. 17 is a diagram illustrating an edge direction for a sub interpolation of a demosaicing method according to example embodiments.

Referring to FIG. 17, the main edge directions for sub interpolation may include a horizontal direction HOR, a vertical direction VER, a first diagonal direction Dd1, and a second diagonal direction Dd2. The horizontal direction HOR may be subdivided into a left direction Dw and a right direction De based on the sub target pixel STP. The vertical direction VER may be subdivided into an upper direction Dn and a lower direction Ds based on the sub target pixel STP.

Figure 18A:
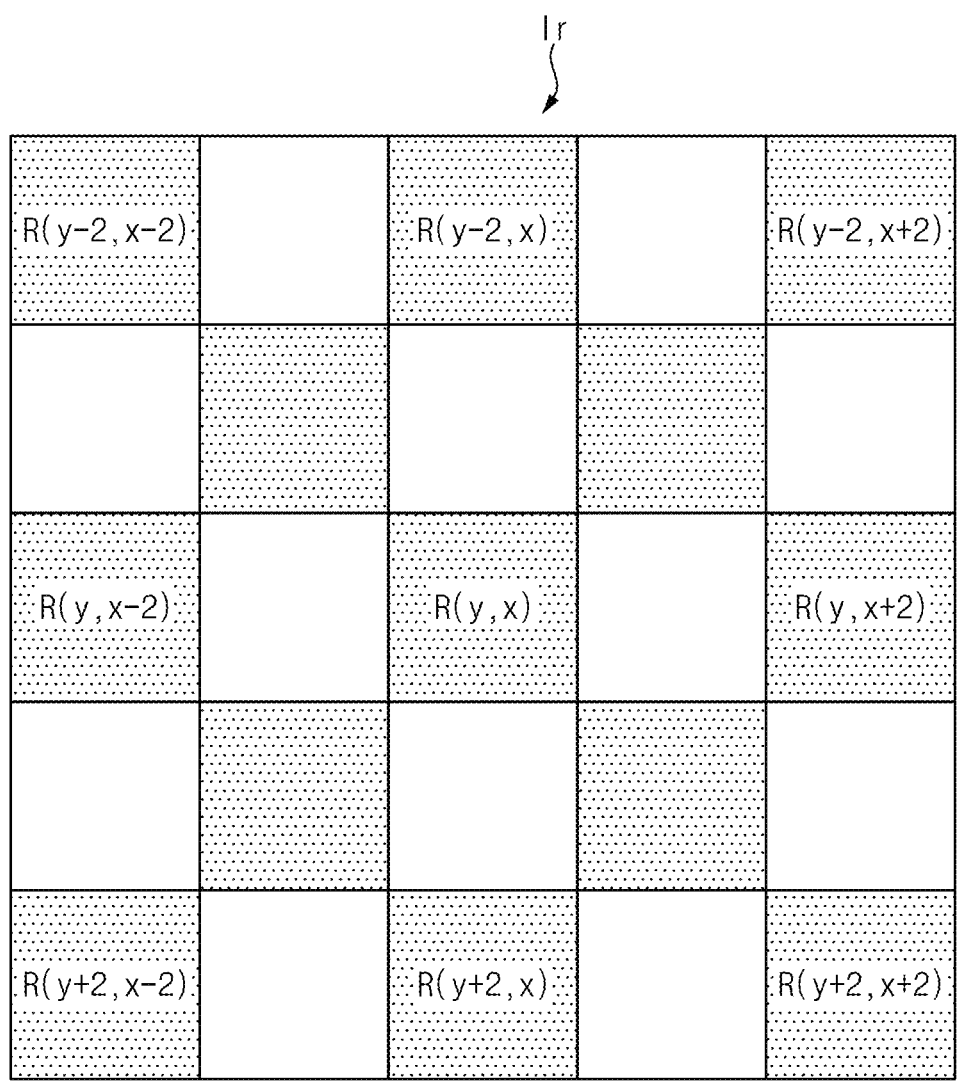
FIGS. 18A and 18B are diagrams illustrating sub color mosaic images corresponding to the input mosaic image of FIG. 3, according to an embodiment.
Figure 18B:
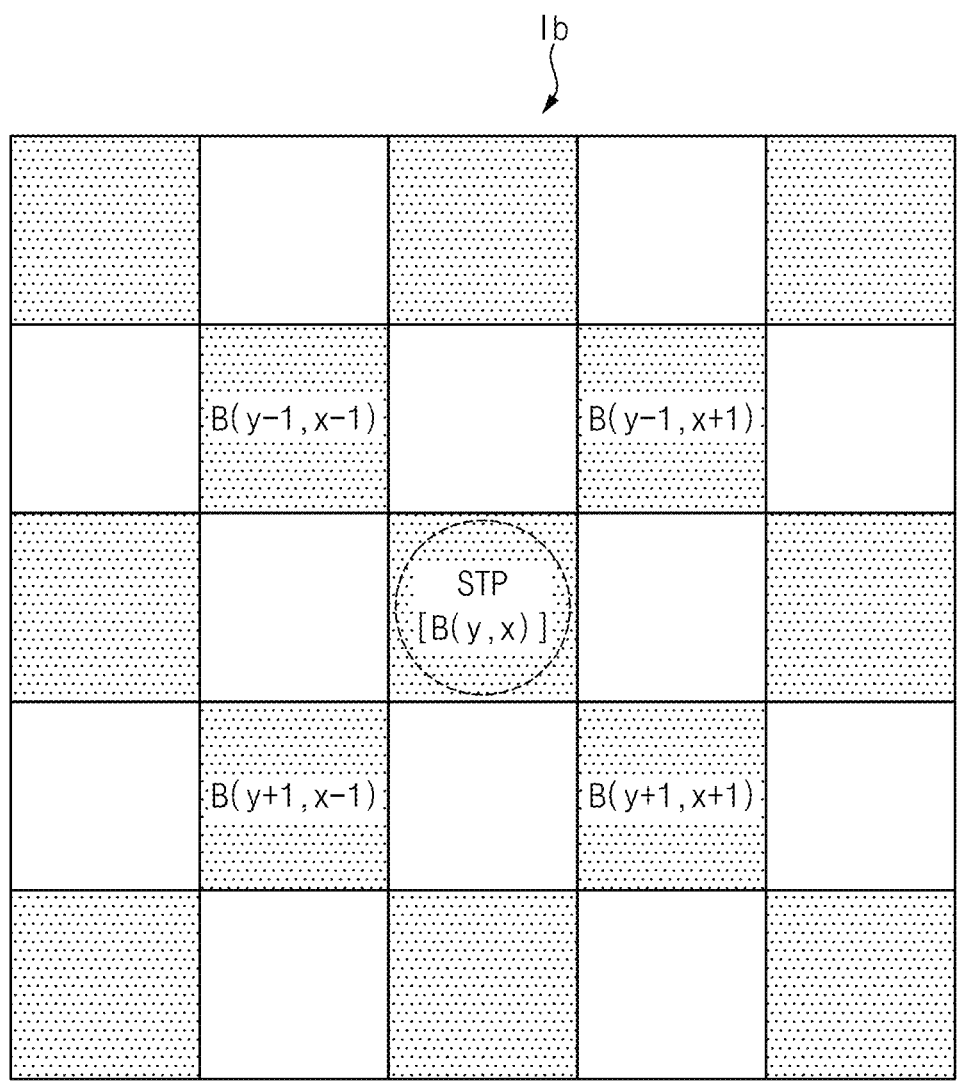
Figure 19A:
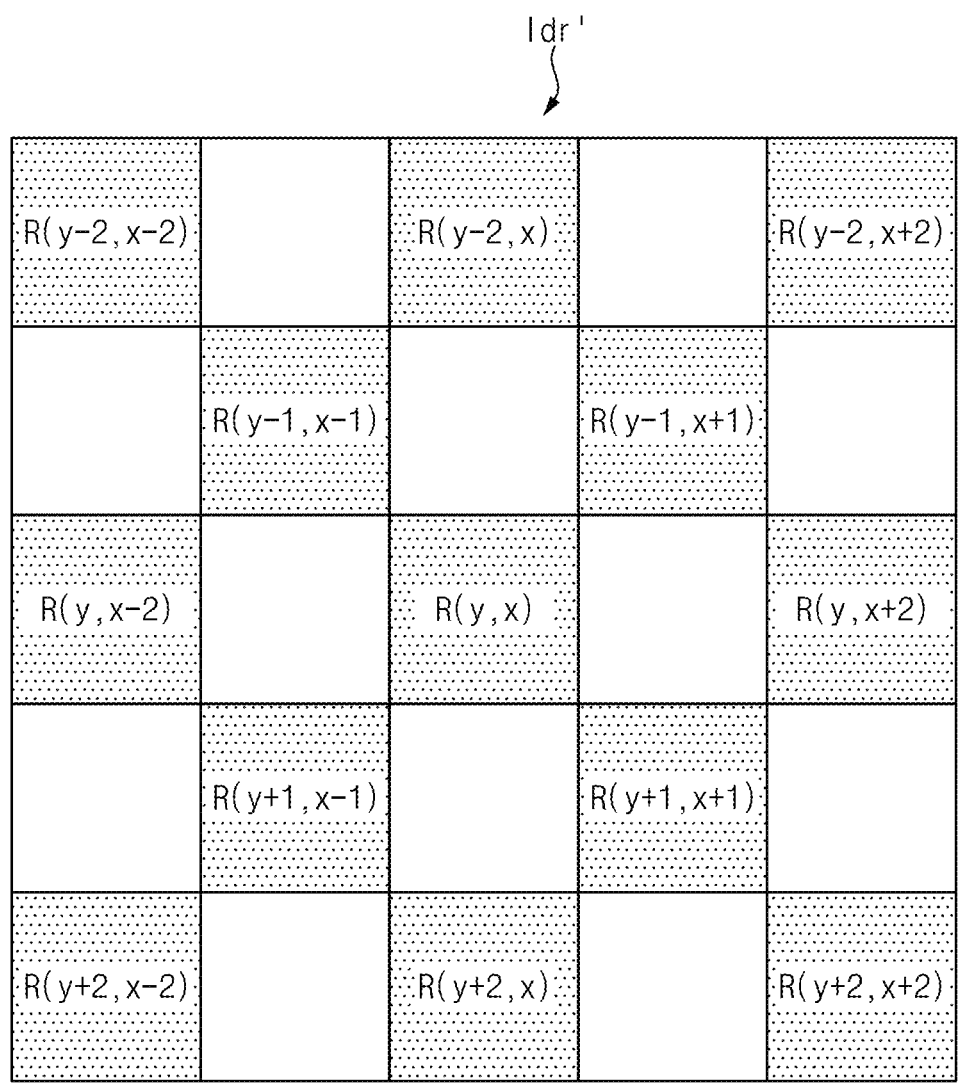
FIGS. 19A and 19B are diagrams illustrating sub color intermediate images corresponding to the input mosaic image of FIG. 3, according to an embodiment.
Figure 19B:
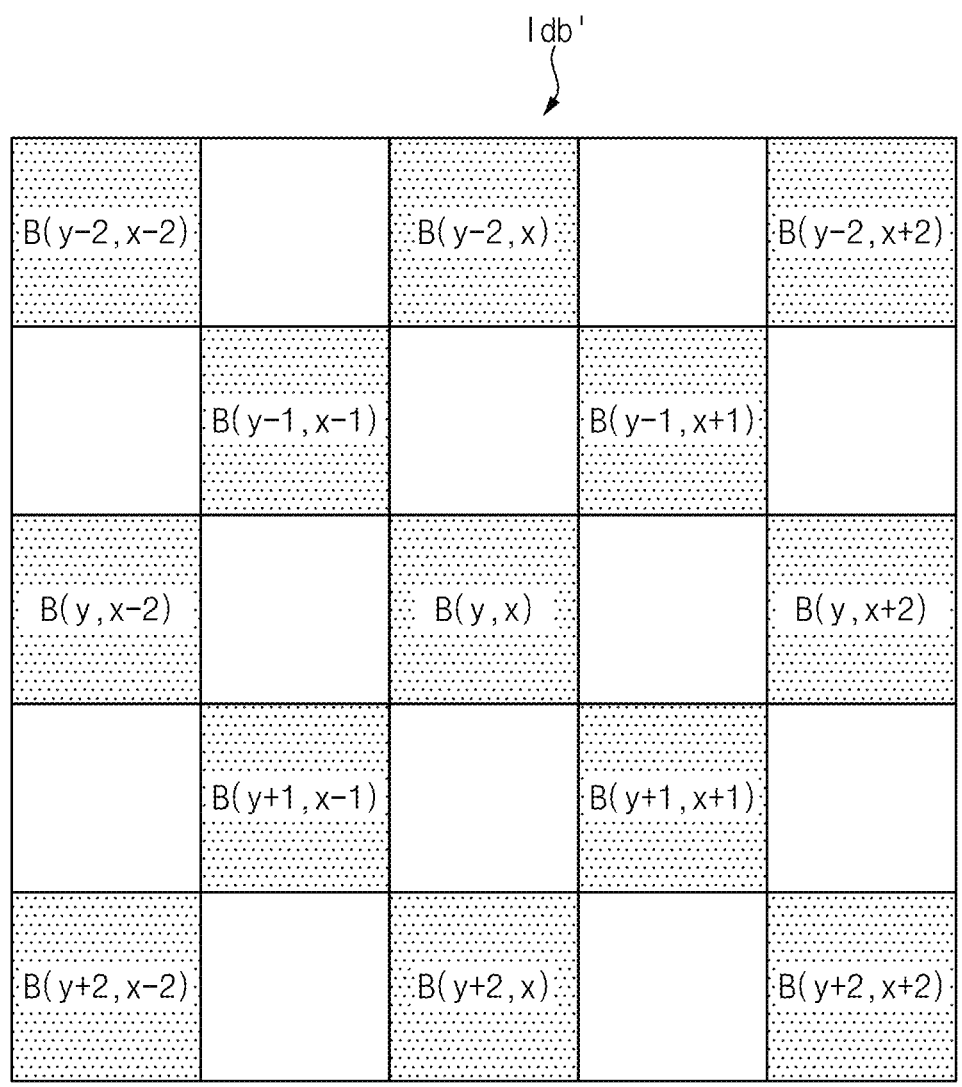

FIGS. 18A and 18B are diagrams illustrating sub color mosaic images corresponding to the input mosaic image of FIG. 3, and FIGS. 19A and 19B are diagrams illustrating sub color intermediate images corresponding to the input mosaic image of FIG. 3.

FIG. 18A shows a red mosaic image Ir corresponding to the first sub color mosaic image in the case of the Bayer pattern, and FIG. 18B shows a blue mosaic image Ib corresponding to the second sub color mosaic image in the case of the Bayer pattern.

19A shows a red intermediate image Idr' corresponding to the first sub color intermediate image in the case of the Bayer pattern, and FIG. 19B shows a blue intermediate image Idb' corresponding to the second sub color intermediate image in the case of the Bayer pattern.

Referring to FIGS. 15 through 19B, the first interpolator 142 may generate the red intermediate image Idr' of FIG. 19A by performing the first sub interpolation on the red mosaic image Ir of FIG. 18A, and generates the blue intermediate image Idb' of FIG. 19B by performing the first sub interpolation on the blue mosaic image Ib of FIG. 18B. For example, the first sub interpolation performed by the first interpolator 142 may be an interpolation to generate the blue pixel values B of the sub target pixels STP corresponding to the red pixel values R of the input mosaic image Im, and generate the red pixel values R of the sub target pixels STP corresponding to the blue pixel values B of the mosaic image Im.

The second interpolator 145 may perform the second sub interpolation on the red intermediate image Idr' of FIG. 19A to generate the red demosaicing image Idr of FIG. 4A and may perform the second sub interpolation on the blue intermediate image Idb' of FIG. 19B to generate the blue demosaicing image Idb of FIG. 4C. That is, the second sub interpolation performed by the second interpolator 145 may be an interpolation to generate the blue pixel values B and red pixel values R of the main target pixels MTP corresponding to the green pixel values G of the input mosaic image Im.

The second sub interpolation for generating the sub color demosaicing images Idr and Idb from the sub color intermediate images Idr' and Idb' may be performed by the same method as the above-described main interpolation for generating the main color demosaicing image Idg from the main color mosaic image Ig. For example, the second sub edge estimator 143 may be implemented substantially the same as the main edge estimator 110 of FIG. 1, and the second interpolator 145 may be implemented substantially the same as the main interpolator 130 of FIG. 1.

Interpolation based on color difference in consideration of the direction of the edge may also be performed on the sub color pixels R and B. For example, based on the sampling rate of the sub color pixels R and B being ¼, it may be difficult to perform directional interpolation like the main color pixel G. Therefore, after first performing the first sub interpolation based on the color difference on B at the R position or R at the B position, the second sub interpolation may be performed in the same way as the main color pixel. When performing the first sub interpolation to increase the sampling rate from ¼ to ½, the non-directional interpolation may cause problems such as false color.

Hereinafter, examples of the first sub interpolation considering directionality are described. As an example, the blue pixel value B(y,x) may be obtained by performing the first sub interpolation on the sub target pixel STP of FIG. 18B corresponding to the red pixel value R(y,x) of the input mosaic image Im.

The blue pixel value B(y,x) at the position (y,x) may be obtained as shown in Equation 15 using the already-interpolated green pixel value G.

$$B(y, x) = G(y, x) - \frac{\sum_{i=\{-1,1\}} \sum_{j=\{-1,1\}} G(y+i, x+j) - B(y+i, x+j)}{4}$$

Equation 15

When interpolation is performed without considering the edge direction as in Equation 15, color errors may occur around strong edges. Accordingly, in example embodiments, directional interpolation may be performed using the interpolated green pixel values G, when performing the first sub interpolation.

First, to determine the first sub edge direction, the first sub edge estimator 141 of FIG. 15 may, with respect to each sub target pixel STP, generate a vertical gradient, a horizontal gradient, a first diagonal gradient and a second diagonal gradient based on the main color pixel values G of the main color demosaiced image Idg. The first sub edge estimator 141 may determine, as the first sub edge direction, one of a vertical direction VER, a horizontal direction HOR, a first diagonal direction Dd1, a second diagonal direction Dd2 and a non-direction, based on a comparison result of the vertical gradient, the horizontal gradient, the first diagonal gradient and the second diagonal gradient.

When the first sub edge direction is the vertical direction VER or the horizontal direction HOR, the first interpolator 142 may generate an upper color difference value, a lower color difference value, a left color difference value and a right color difference value based on the main color pixel values G of the main color demosaiced image Idg and the first sub color pixel values R or the second sub color pixel values B of the input mosaic image Im (e.g., the first sub color mosaic image Ir and the second sub color mosaic image Ib)

In some example embodiments, in the case of interpolation of the blue pixel value B(y,x) at the position (y,x) of FIG. 18B, the upper color difference value Un, the lower color difference value Us, and the left color difference value Uw and the right color difference value Ue may be obtained as shown in Equation 16.

$Un(y, x) = [G(y-1, x-1) -$

Equation 16

$B(y-1, x-1) + G(y-1, x+1) - B(y-1, x+1)]/2$ $Us(y, x) =$ $[G(y+1, x-1) - B(y+1, x-1) + G(y+1, x+1) - B(y+1, x+1)]/2$ $Uw(y, x) =$ $[G(y-1, x-1) - B(y-1, x-1) + G(y+1, x-1) - B(y+1, x-1)]/2$ $Ue(y, x) =$ $[G(y-1, x+1) - B(y-1, x+1) + G(y+1, x+1) - B(y+1, x+1)]/2$

When the first sub edge direction is the horizontal direction HOR, a first sub color pixel value R or a second sub color pixel value B corresponding to each sub target pixel STP may be generated based on the upper color difference value Un and the lower color difference value Us. In embodiments, when the first sub edge direction is the vertical direction HOR, the first sub color pixels R or the second sub color pixel value B corresponding to each sub target pixel STP may be generated based on the left color difference value Uw and the right color difference value Ue.

In some example embodiments, when the first sub edge direction is the horizontal direction HOR, the directional color difference value U may be obtained as shown in Equation 17, and when the first sub edge direction is the vertical direction VER, the directional color difference value U may be obtained as shown in Equation 18.

$$U(y, x) = \frac{U_n(y, x)\Delta_s(y, x) + U_s(y, x)\Delta_n(y, x)}{\Delta_n(y, x) + \Delta_s(y, x)}$$

Equation 17

$$U(y, x) = \frac{U_w(y, x)\Delta_e(y, x) + U_e(y, x)\Delta_w(y, x)}{\Delta_e(y, x) + \Delta_w(y, x)}$$

Equation 18

In Equations 17 and 18, $\Delta_n(y,x)$, $\Delta_n(y,x)$, $\Delta_n(y,x)$, $\Delta_n(y,x)$ are direction weight values. The first interpolator 142 may generate direction weight values based on the corresponding gradients of the main color pixel values G of the neighboring pixels adjacent to the sub target pixel STP, as shown in Equation 19.

$$\Delta_n(y, x) = \sum_{i=-1}^{1} |G(y-1, x+i) - G(y, x+i)|/3$$

Equation 19

$$\Delta_s(y, x) = \sum_{i=-1}^{1} |G(y+1, x+i) - G(y, x+i)|/3$$

$$\Delta_w(y, x) = \sum_{i=-1}^{1} |G(y+i, x-1) - G(y+i, x)|/3$$

$$\Delta_e(y, x) = \sum_{i=-1}^{1} |G(y+i, x+1) - G(y+i, x)|/3$$

Based on the direction weight values $\Delta_n(y,x)$, $\Delta_n(y,x)$, $\Delta_n(y,x)$, $\Delta_n(y,x)$ of Equation 19, the weighted average value, which may be for example the directional color difference value U of the color difference values corresponding to the horizontal direction HOR of Equation 17, or the weighted average value of the color difference values corresponding to the vertical direction VER of Equation 18, may be generated. Equation 19 shows an example in which each direction weight value corresponds to a simple average of three pixel values, but example embodiments are not limited thereto. According to example embodiments, a higher weight may be assigned to a pixel located in the center.

In embodiments, when the first sub edge direction is the first diagonal direction Dd1, a first sub pixel value or a second sub pixel value corresponding to the sub target pixel STP may be generated based on an arithmetic average value of color difference values of pixels adjacent to each sub target pixel STP in the first diagonal direction Dd1, In addition, when the first sub edge direction is the second diagonal direction Dd2, the first sub color pixel value or the second sub color pixel value corresponding to each sub target pixel STP may be generated based on an arithmetic average value of color difference values of pixels adjacent to each sub target pixel STP in the second diagonal direction Dd2.

In some example embodiments, the directional color difference value U may be obtained as in Equation 20 when the first sub edge direction is the first diagonal direction Dd1, and the directional color difference value U may be obtained as in Equation 21 when the first sub edge direction is the second diagonal direction Dd2.

$$U(y, x) = [G(y-1, x+1) - \qquad \text{Equation 20}$$
$$B(y-1, x+1) + G(y+1, x-1) - B(y+1, x-1)]/2$$

$$U(y, x) = [G(y-1, x-1) - \qquad \text{Equation 21}$$
$$B(y-1, x-1) + G(y+1, x+1) - B(y+1, x+1)]/2$$

In the case of the first diagonal direction Dd1 or the second diagonal direction Dd2, because the sub color pixel values exist in the corresponding direction, the directional color difference value U for interpolation may be directly obtained as shown in Equations 20 and 21.

When the first sub edge direction is the non-direction, a first sub pixel value or a second sub pixel value corresponding to each sub target pixel STP may be generated based on the arithmetic average value of the color difference values of pixels adjacent to each sub target pixel STP in the first diagonal direction Dd1 and the second diagonal direction Dd2.

In some example embodiments, when the first sub edge direction is the non-direction, the direction color difference value U may be obtained as shown in Equation 22.

$$U(y, x) = [G(y-1, x+1) - B(y-1, x+1) + \qquad \text{Equation 22}$$
$$G(y+1, x-1) - B(y+1, x-1) + G(y-1, x-1) -$$
$$B(y-1, x-1) + G(y+1, x+1) - B(y+1, x+1)]/4$$

Finally, the blue pixel value B(y,x) at the position (y,x) of FIG. 18B may be obtained as shown in Equation 23.

$$B(y, x) = G(y, x) - U(y, x) \qquad \text{Equation 23}$$

The direction color difference value U of Equation 23 may correspond to one of Equations 17, 18, 21, 22, and 23 according to the first sub edge direction.

The first sub edge direction may be determined based on the main color demosaicing image Idg interpolated with the weighted average. The non-directional interpolation may be performed in the chroma region because the edge direction may be distorted if the chrominance value is large.

Figure 20:
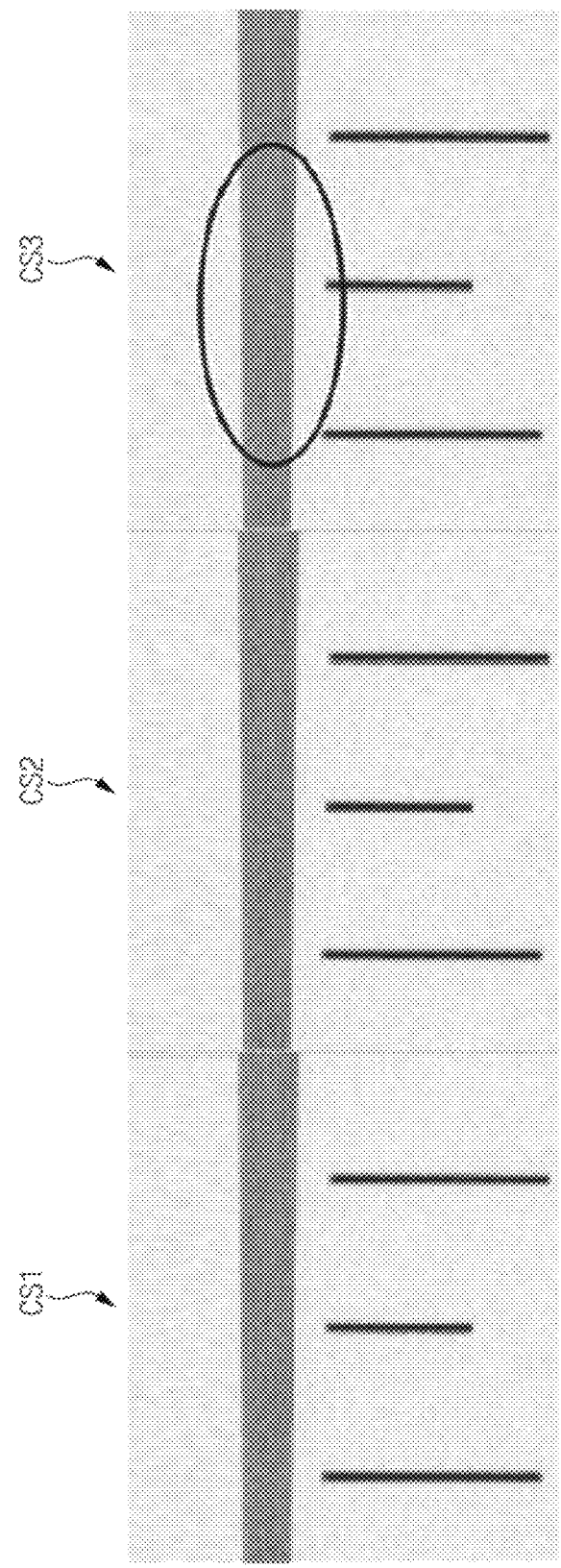
FIG. 20 is a diagram illustrating images showing effects of a demosaicing method according to an embodiment.

FIG. 20 is a diagram illustrating images showing effects of a demosaicing method according to example embodiments.

FIG. 20 shows display images CS1 corresponding to demosaicing images generated by a related-art method and display images CS2 and CS3 corresponding to demosaicing images generated by a demosaicing method according to example embodiments. The display image CS2 shows the result of applying the main interpolation based on the gradient-based directional color difference described with reference to FIG. 14 and the sub interpolation in consideration of the directionality described with reference to FIGS. 15 through 19B when omitting the high-frequency edge enhancement described with reference to FIGS. 6 through 13. The display image CS3 shows the result of applying the high-frequency edge enhancement, the main interpolation based on gradient-based directional color difference, and the sub interpolation considering directionality.

As shown in FIG. 20, it may be seen that, compared to related-art interpolation, color error may be reduced and image quality may be improved according to example embodiments.

Figure 21:
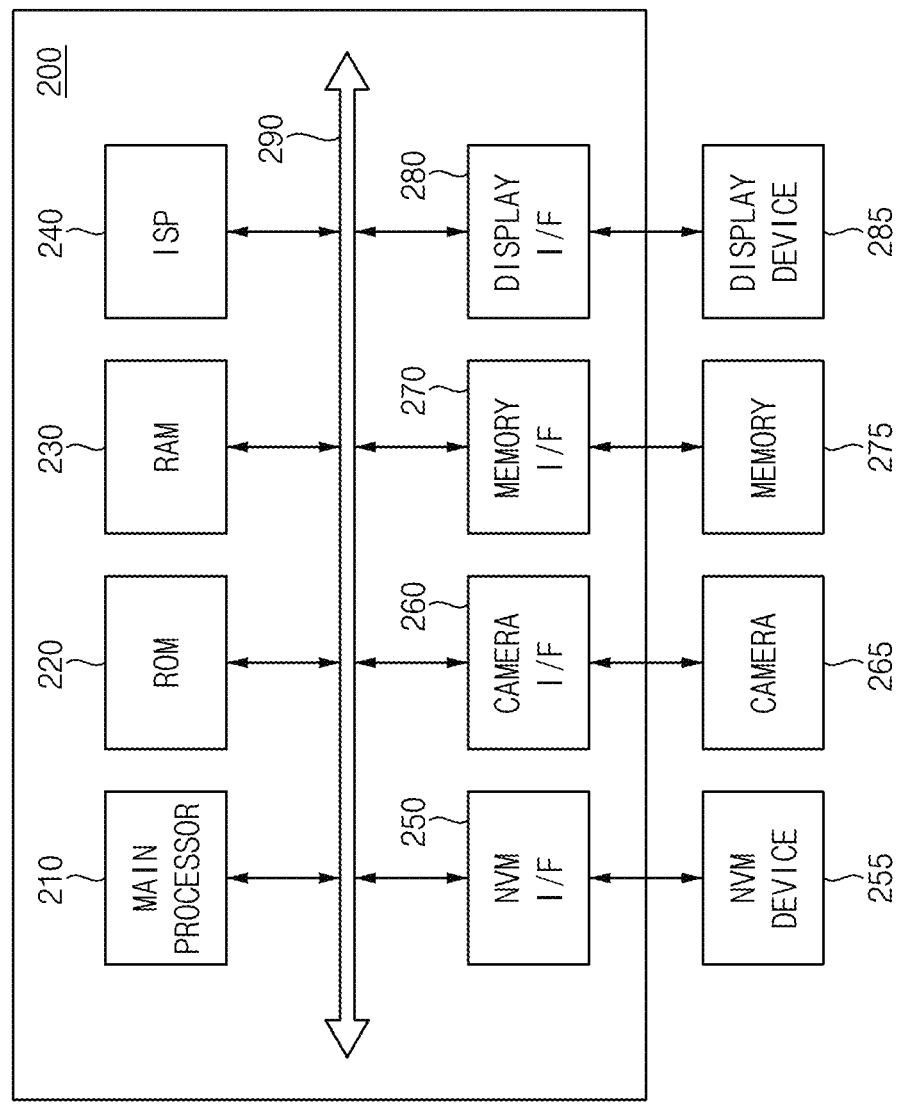
FIG. 21 is a block diagram illustrating an image processing system according to an embodiment.

FIG. 21 is a block diagram illustrating an image processing system according to example embodiments.

Referring to FIG. 21, an image processing system 200 may include a main processor 210, a ROM 220, a RAM 230, an ISP 240, a non-volatile memory interface 250, a camera interface 260, a memory interface 270, and/or a display interface 280. The elements (e.g., the main processor 210, the ROM 220, the RAM 230, ISP 240, the non-volatile memory interface 250, the camera interface 260, the memory interface 270, and the display interface 280) of the image processing system 200 may transmit or receive data through a system bus 290. In some example embodiments, the image processing system 200 may be implemented as a SoC. In some example embodiments, the image processing system 200 may be an application processor.

The main processor 210 may control an overall operation of the image processing system 200. The main processor 210 may be implemented with, for example, a CPU, a microprocessor, an ARM processor, an X86 processor, or an MIPS processor. According to some example embodiments, the main processor 210 may be implemented with one computing component (e.g., a multi-core processor) including two or more independent processors (or cores). The main processor 210 may process or execute data and an instruction code (or programs) each stored in the ROM 220 or the RAM 230.

The ROM 220 may store programs and/or data which are/is used continuously. The ROM 220 may be implemented as EPROM or EEPROM.

The RAM 230 may temporarily store programs, data, and/or instructions. According to some example embodiments, the RAM 230 may be implemented as DRAM or SRAM. The RAM 230 may temporarily store image data which is input/output through the interfaces 250 to 280 or is generated through image processing by the ISP 240.

The non-volatile memory interface 250 may provide an interface for data input from a non-volatile memory device 255 or data output to a non-volatile memory device 255. The non-volatile memory device 255 may be implemented with, for example, a memory card (for example, multi-media card (MMC), embedded multi-media card (eMMC), SD card, or micro SD card).

The camera interface 260 may provide an interface for image data (for example, raw image data) input from a camera 265 disposed outside the image processing system 200. The camera 265 may generate data corresponding to an image captured by using a plurality of light sensing devices. Image data received through the camera interface 260 may be provided to the ISP 240 or may be stored in a memory 275 through the memory interface 270.

The memory interface 270 may provide an interface for data input from the memory 275 or data output to the memory 275. According to some example embodiments, the memory 275 may be implemented as a volatile memory such as DRAM or SRAM or a non-volatile memory such as ReRAM, PRAM, or NAND flash.

The display interface 280 may interface data (for example, image data) output to a display device 285. The display device 285 may output an image signal based on image data through a display such as a liquid crystal display (LCD) or an active matrix organic light emitting diode (AMOLED).

The ISP 240 may perform image processing on the image data provided from the camera 265 to generate converted image data and may store the converted image data in the memory 275 or may scale the converted image data to provide a scaled image to the display device 285.

The demosaicing devices as described with reference to FIGS. 1 through 20, for example the demosaicing device 100, may be included in the ISP 240 of FIG. 21.

Figure 22:
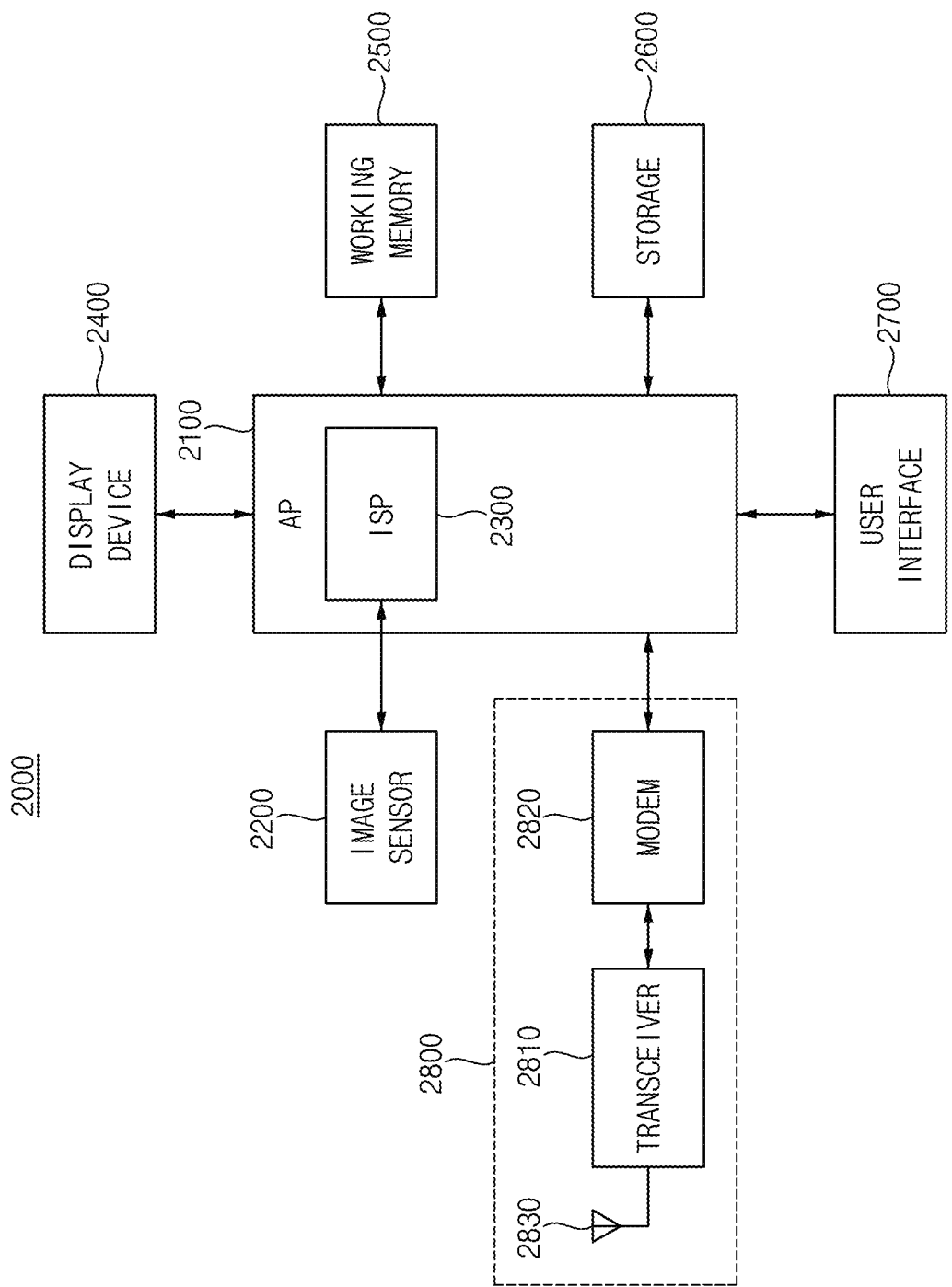
FIG. 22 is a block diagram illustrating a system according to an embodiment.

FIG. 22 is a block diagram illustrating a system according to example embodiments.

Referring to FIG. 22, the image processing device 2000 according to some example embodiments may include an application processor (AP) 2100, an image sensor 2200, a display device 2400, a working memory 2500, a storage 2600, a user interface 2700, and/or a wireless transceiver 2800, and the application processor 2100 may include an ISP 2300. The demosaicing device 100 of FIG. 1 may be included in the ISP 2300. In some example embodiments, the ISP 2300 may be implemented as a separate integrated circuit independently from the application processor 2100.

The application processor 2100 may control an overall operation of the image processing device 2000 and may be provided as an SoC which drives an application program and an operating system (OS).

The application processor 2100 may control an operation of the ISP 2300 and may provide or store converted image data, generated by the ISP 2300, to the display device 2400 or in the storage 2600.

The image sensor 2200 may generate image data (for example, raw image data) based on a received light signal and may provide the image data to the ISP 2300.

The working memory 2500 may be implemented as a volatile memory such as DRAM or SRAM or a non-volatile resistive memory such as FeRAM, RRAM, or PRAM. The working memory 2500 may store programs and/or data each processed or executed by the application processor 2100.

The storage 2600 may be implemented as a non-volatile memory device such as NAND flash or a resistive memory, and for example, may be provided as a memory card (for example, MMC, eMMC, SD, or micro SD). The storage 2600 may store data and/or a program which correspond(s) to an execution algorithm for controlling an image processing operation of the ISP 2300, and when the image processing operation is performed, the data and/or the program may be loaded into the working memory 2500. In some example embodiments, the storage 2600 may store image data (for example, converted image data or post-processed image data) generated by the ISP 2300.

The user interface 2700 may be implemented with various devices, such as a keyboard, a curtain key panel, a touch panel, a fingerprinted sensor, and a microphone, for receiving a user input. The user interface 2700 may receive the user input and may provide the application processor 2100 with a signal corresponding to the received user input.

The wireless transceiver 2800 may include a transceiver 2810, a modem 2820, and an antenna 2830.

As described above, a demosaicing method and a demosaicing device according to example embodiments may reduce color error near edges and improve image sharpness by improving the performance of detecting the edge direction through high-frequency edge enhancement. In addition, a demosaicing method a the demosaicing device according to example embodiments may further improve the image sharpness through the main interpolation which may extract the directional color difference based on the gradient, and the sub interpolation which may consider directionality.

Example embodiments may be applied to any electronic devices and systems. For example, the inventive concepts may be applied to systems such as a memory card, a solid state drive (SSD), an eMMC, a universal flash storage (UFS), a mobile phone, a smart phone, a PDA, a portable multimedia player (PMP), a digital camera, a camcorder, a personal computer (PC), a server computer, a workstation, a laptop computer, a digital television (TV), a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, etc One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a SoC, a programmable logic unit, a microprocessor, an ASIC, etc.

The foregoing is illustrative of example embodiments and is not to be construed as limiting thereof. Although a few example embodiments have been described, those skilled in the art will readily appreciate that many modifications are possible in the example embodiments without materially departing from the scope of the present disclosure.

What is claimed is:

1. A demosaicing method for an input mosaic image, the demosaicing method comprising:
    obtaining an input image comprising main color pixel values corresponding to a main color, first sub color pixel values corresponding to a first sub color, and second sub color pixel values corresponding to a second sub color, wherein the main color pixel values, the first sub color pixel values, and the second sub color pixel values are arranged in a regular pattern;
    for each sub target pixel from among sub target pixels corresponding to the first sub color pixel values and the second sub color pixel values, estimating a main edge direction based on the main color pixel values;

determining the main edge direction by performing edge enhancement based on the input mosaic image;

generating a main color demosaiced image corresponding to the main color by performing a main interpolation based on the main edge direction to generate interpolated main color pixel values corresponding to the sub target pixels; and generating a first sub color demosaiced image corresponding to the first sub color and a second sub color demosaiced image corresponding to the second sub color by performing a sub interpolation to generate interpolated first sub color pixel values and interpolated second sub color pixel values for the sub target pixels and for main target pixels corresponding to the main color pixel values.

2. The demosaicing method of claim 1, wherein performing the edge enhancement includes, for each sub target pixel:

generating a vertical filter value by filtering the input mosaic image using a vertical edge enhancement filter;

generating a horizontal filter value by filtering the input mosaic image using a horizontal edge enhancement filter;

determining an enhancement edge direction by comparing the vertical filter value and the horizontal filter value;

generating a reference chrominance value based on the input mosaic image; and determining whether to replace the main edge direction with the enhancement edge direction.

3. The demosaicing method of claim 2, wherein the determining whether to replace the main edge direction with the enhancement edge direction comprises:

determining to replace the main edge direction with the enhancement edge direction based on the reference chrominance value being smaller than a threshold chrominance value, the main edge direction being a horizontal direction or a vertical direction, and a difference between the vertical filter value and the horizontal filter value being greater than a first threshold value.

4. The demosaicing method of claim 3, wherein the determining whether to replace the main edge direction with the enhancement edge direction further comprising:

determining to replace the main edge direction with the enhancement edge direction based on the reference chrominance value being smaller than the threshold chrominance value, the main edge direction being a non-direction, and the difference between the vertical filter value and the horizontal filter value being greater than a second threshold value.

5. The demosaicing method of claim 2, wherein the determining whether to replace the main edge direction with the enhancement edge direction comprises:

determining to maintain the main edge direction without replacement with the high-frequency edge direction based on the reference chrominance value being greater than a threshold chrominance value.

6. The demosaicing method of claim 2, wherein the generating the reference chrominance value comprises:

generating a horizontal chrominance value based on the input mosaic image;

generating a vertical chrominance value based on the input mosaic image;

determining a maximum chrominance value from among the horizontal chrominance value and the vertical chrominance value; and determining, as the reference chrominance value, one of the horizontal chrominance value, the vertical chrominance value and the maximum chrominance value based on the vertical filter value and the horizontal filter value.

7. The demosaicing method of claim 1, wherein the performing the main interpolation comprises:

for each sub target pixel, generating an upper coefficient value, a lower coefficient value, a left coefficient value and a right coefficient value based on a gradient of the input mosaic image;

generating an upper color difference value, a lower color difference value, a left color difference value and a right color difference value based on the upper coefficient value, the lower coefficient value, the left coefficient value, and the right coefficient value; and generating an interpolated main color pixel value for each sub target pixel based on color difference values corresponding to the main edge direction from among the upper color difference value, the lower color difference value, the left color difference value, and the right color difference value.

8. The demosaicing method of claim 7, wherein the generating the interpolated main color pixel value comprises:

based on the main edge direction being a vertical direction, generating the interpolated main color pixel value based on the upper color difference value and the lower color difference value;

based on the main edge direction being a horizontal direction, generating the interpolated main color pixel value based on the left color difference value and the right color difference value; and based on the main edge direction being a non-direction, generating the interpolated main color pixel value based on the upper color difference value, the lower color difference value the left color difference value and the right color difference value.

9. The demosaicing method of claim 7, wherein each coefficient value of the upper coefficient value, the lower coefficient value, the left coefficient value and the right coefficient value comprises:

a first coefficient value corresponding to a gradient of the main color pixel values of neighboring pixels adjacent to each sub target pixel; and a second coefficient value corresponding to a product of a gradient of the first sub color pixel values or the second sub color pixel values of the neighboring pixels and a Laplacian of pixel values of each sub target pixel and the neighboring pixels.

10. The demosaicing method of claim 7, wherein the generating the interpolated main color pixel value comprises:

generating direction weight values based on gradients of pixel values of neighboring pixels adjacent to each sub target pixel;

generating a weighted average value of color difference values corresponding to the main edge direction based on the direction weight values; and generating the interpolated main color pixel value based on the weighted average value and the main color pixel values of the neighboring pixels.

11. The demosaicing method of claim 1, wherein the performing the sub interpolation comprises:

for each sub target pixel, determining a first sub edge direction based on the main color pixel values; and performing a first sub interpolation based on the first sub edge direction to generate the interpolated first sub color pixel values for first sub target pixels which correspond to the second sub color pixel values, and to generate the interpolated second sub color pixel values for second sub target pixels which correspond to the first sub color pixel values generating a first sub color intermediate image and a second sub color intermediate image based on the interpolated first sub color pixel values and the interpolated second sub color pixel values.

12. The demosaicing method of claim 11, wherein the determining the first sub edge direction comprises:
    for each sub target pixel, generating a vertical gradient, a horizontal gradient, a first diagonal gradient, and a second diagonal gradient based on the main color pixel values of the main color demosaiced image; and
    determining the first sub edge direction as one of a vertical direction, a horizontal direction, a first diagonal direction, a second diagonal direction and a non-direction, based on a result of a comparison between the vertical gradient, the horizontal gradient, the first diagonal gradient and the second diagonal gradient.

13. The demosaicing method of claim 11, wherein the performing the first sub interpolation comprises:
    based on the first sub edge direction being a vertical direction or a horizontal direction, generating an upper color difference value, a lower color difference value, a left color difference value and a right color difference value based on the main color pixel values, and the first sub color pixel values or the second sub color pixel values;
    based on the first sub edge direction being the horizontal direction, generating an interpolated sub color pixel value corresponding to each sub target pixel based on the upper color difference value and the lower color difference value, wherein the interpolated sub color pixel value comprises one of an interpolated first sub color pixel value or an interpolated second sub color pixel value; and
    based on the first sub edge direction being the vertical direction, generating the interpolated sub color pixel value based on the left color difference value and the right color difference value.

14. The demosaicing method of claim 13, wherein the generating the interpolated sub color pixel value comprises:
    generating direction weight values based on gradients of the main color pixel values of neighboring pixels adjacent to each sub target pixel;
    generating a weighted average value of color difference values corresponding to the horizontal direction or the vertical direction based on the direction weight values; and
    generating the interpolated sub color pixel value based on the weighted average value and an interpolated main color pixel value of each sub target pixel.

15. The demosaicing method of claim 11, wherein the performing the first sub interpolation comprises:
    based on the first sub edge direction being a first diagonal direction, generating an interpolated sub color pixel value corresponding to each sub target pixel based on an arithmetic average value of color difference values of pixels adjacent to each sub target pixel in the first diagonal direction, wherein the interpolated sub color pixel value comprises one of an interpolated first sub color pixel value or an interpolated second sub color pixel value;
    based on the first sub edge direction being a second diagonal direction, generating the interpolated sub color pixel value based on an arithmetic average value of color difference values of pixels adjacent to each sub target pixel in the second diagonal direction; and
    based on the first sub edge direction being a non-direction, generating the interpolated sub color pixel value based on an arithmetic average value of color difference values of the pixels adjacent to each sub target pixel in the first diagonal direction and the pixels adjacent to each sub target pixel in the second diagonal direction.

16. The demosaicing method of claim 11, wherein the performing the sub interpolation comprises:
    for each main target pixel of the main target pixels, estimating a second sub edge direction based on the first sub color intermediate image or the second sub color intermediate image;
    determining the second sub edge direction by performing edge enhancement based on the input mosaic image; and
    generating the first sub color demosaiced image and the second sub color demosaiced image by performing a second sub interpolation based on the second sub edge direction to generate the interpolated first sub color pixel values and the interpolated second sub color pixel values for the main target pixels.

17. The demosaicing method of claim 1, wherein a sampling rate corresponding to the main color is greater than a sampling rate corresponding the first sub color and a sampling rate corresponding to the second sub color.

18. The demosaicing method of claim 1, wherein the main color corresponds to a green color, the first sub color corresponds to a red color, the second sub color corresponds to a blue color, and the input mosaic image has a Bayer pattern.

19. A demosaicing method of an input mosaic image, the demosaicing method comprising:
    obtaining an input image in which green pixel values corresponding to a green color, red pixel values corresponding to a red color, and blue pixel values corresponding to a blue color are arranged in a Bayer pattern;
    for each sub target pixel from among sub target pixels corresponding to the red pixel values and the blue pixel values of the input mosaic image, estimating a main edge direction based on the green pixel values;
    determining the main edge direction by performing edge enhancement based on the input mosaic image;
    generating a green demosaiced image corresponding to the green color by performing a main interpolation based on the main edge direction to generate interpolated green color pixel values for the sub target pixels;
    for each sub target pixel, determining a first sub edge direction based on the green pixel values;
    generating a red intermediate image and a blue intermediate image by performing a first sub interpolation based on the first sub edge direction to generate interpolated red pixel values for the sub target pixels corresponding to the blue pixel values, and to generate interpolated blue pixel values for the sub target pixels corresponding to the red pixel values;
    for each main target pixel from among main target pixels corresponding to the green pixel values, estimating a second sub edge direction based on the red intermediate image or the blue intermediate image;
    determining the second sub edge direction by performing the edge enhancement based on the input mosaic image; and
    generating red demosaiced image and a blue demosaiced image by performing a second sub interpolation based on the second sub edge direction to generate interpolated red pixel values for the main target pixels and interpolated blue pixel values for the main target pixels.

20. A demosaicing device for an input mosaic image in which main color pixel values corresponding to a main color, first sub color pixel values corresponding to a first sub color, and second sub color pixel values corresponding to a second sub color are arranged in a regular pattern, the demosaicing device comprising:
- a main edge estimator configured to, for each sub target pixel from among sub target pixels corresponding to the first sub color pixel values and the second sub color pixel values, estimate a main edge direction based on the main color pixel values;
- a main edge enhancer configured to determine the main edge direction by performing edge enhancement based on the input mosaic image;
- a main interpolator configured to generate a main color demosaiced image corresponding to the main color by performing a main interpolation based on the main edge direction to generate interpolated main color pixel values for the sub target pixels; and
- a sub interpolator configured to generate a first sub color demosaiced image corresponding to the first sub color and a second sub color demosaiced image corresponding to the second sub color by performing a sub interpolation to generate interpolated first sub color pixel values and interpolated second sub color pixel values for the sub target pixels and for main target pixels corresponding to the main color pixel values.

* * * * *